United States Patent
Matsumoto et al.

(10) Patent No.: US 7,423,709 B2
(45) Date of Patent: Sep. 9, 2008

(54) COLOR FILTER SUBSTRATE, MANUFACTURING METHOD OF COLOR FILTER SUBSTRATE, ACTIVE MATRIX TYPE LIQUID CRYSTAL DISPLAY, AND MANUFACTURING METHOD OF ACTIVE MATRIX TYPE LIQUID CRYSTAL DISPLAY

(75) Inventors: Kimikazu Matsumoto, Tokyo (JP); Syunsuke Shiga, Tokyo (JP)

(73) Assignee: NEC LCD Technologies, Ltd., Kawasaki (JP)

( * ) Notice: Subject to any disclaimer, the term of this patent is extended or adjusted under 35 U.S.C. 154(b) by 0 days.

(21) Appl. No.: 10/834,765

(22) Filed: Apr. 29, 2004

(65) Prior Publication Data

US 2004/0202945 A1  Oct. 14, 2004

Related U.S. Application Data

(63) Continuation of application No. 09/981,065, filed on Oct. 16, 2001, now abandoned.

(30) Foreign Application Priority Data

Oct. 20, 2000 (JP) .............................. 2000-320830

(51) Int. Cl.
*G02F 1/1335* (2006.01)
(52) U.S. Cl. ..................... 349/106; 349/108; 349/109
(58) Field of Classification Search ................. 349/79, 349/80, 106–108, 110, 109
See application file for complete search history.

(56) References Cited

U.S. PATENT DOCUMENTS

| | | | | |
|---|---|---|---|---|
| 5,040,875 | A | * | 8/1991 | Noguchi ..................... 349/143 |
| 5,598,285 | A | * | 1/1997 | Kondo et al. .................. 349/39 |
| 6,124,909 | A | * | 9/2000 | Miyashita et al. ........... 349/109 |
| 6,147,729 | A | | 11/2000 | Kurauchi et al. |
| 6,365,916 | B1 | | 4/2002 | Zhong et al. |
| 6,429,916 | B1 | | 8/2002 | Nakata et al. |
| 6,429,917 | B1 | | 8/2002 | Okamoto et al. |
| 6,552,764 | B2 | | 4/2003 | Fujioka et al. |
| 2001/0040654 | A1 | | 11/2001 | Koike et al. |
| 2003/0128311 | A1 | * | 7/2003 | Tsuda et al. ................. 349/106 |
| 2004/0252260 | A1 | * | 12/2004 | Nishida et al. .............. 349/107 |

FOREIGN PATENT DOCUMENTS

| | | |
|---|---|---|
| JP | 6-242433 | 9/1994 |
| JP | 6-331975 | 12/1994 |
| JP | 10133191 A | 5/1998 |
| JP | 11-142882 | 5/1999 |
| JP | 2000-089248 | 3/2000 |

* cited by examiner

*Primary Examiner*—Matthew C Landau
(74) *Attorney, Agent, or Firm*—Katten Muchin Rosenman LLP

(57) ABSTRACT

A color filter substrate is provided with a transparent substrate and color filters of three colors with a bored part provided at every pixel on the transparent substrate. Color filters neighboring to each other in one direction are connected to each other. A thin film transistor is to oppose to the bored part. Data lines are to be aligned along said one direction.

3 Claims, 31 Drawing Sheets

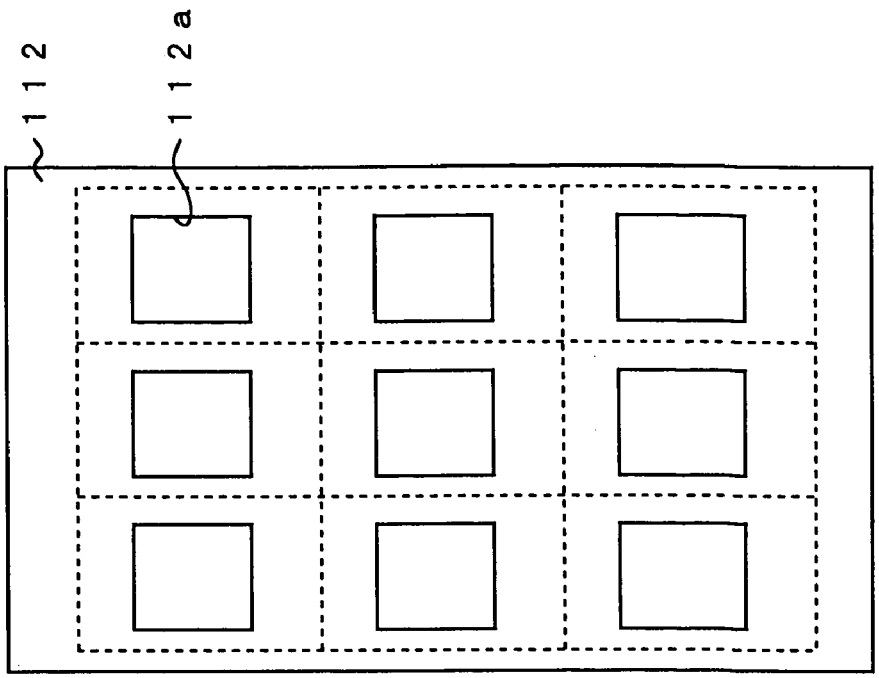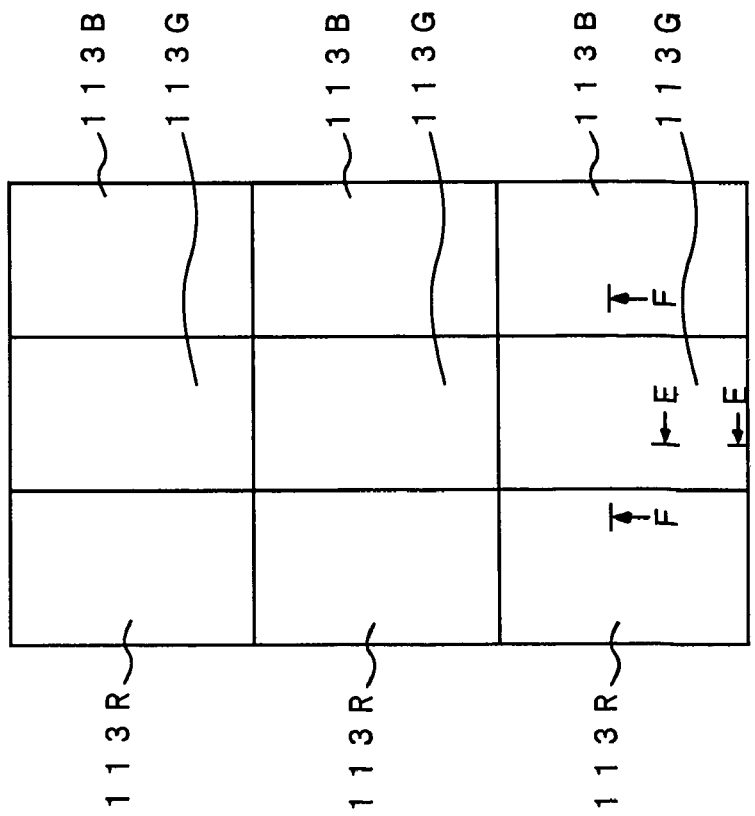

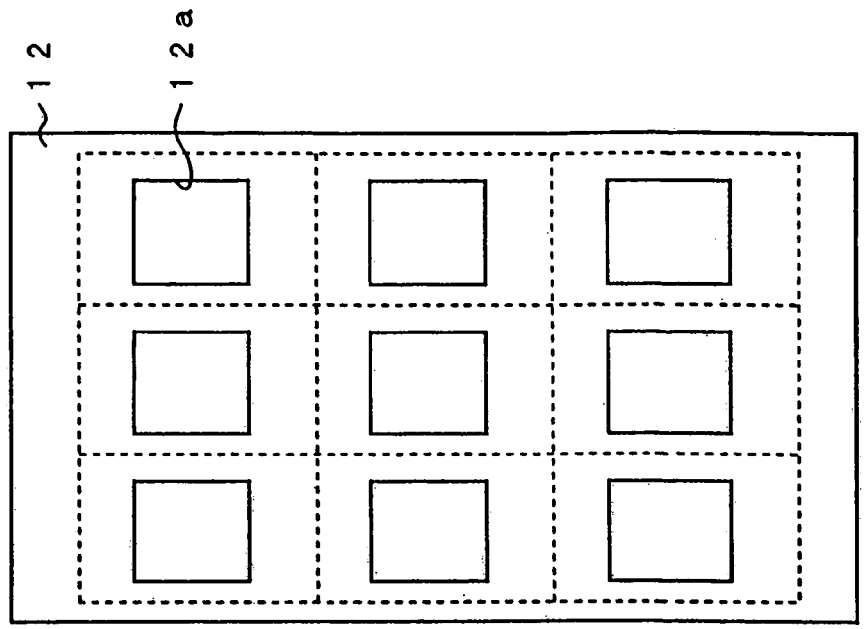
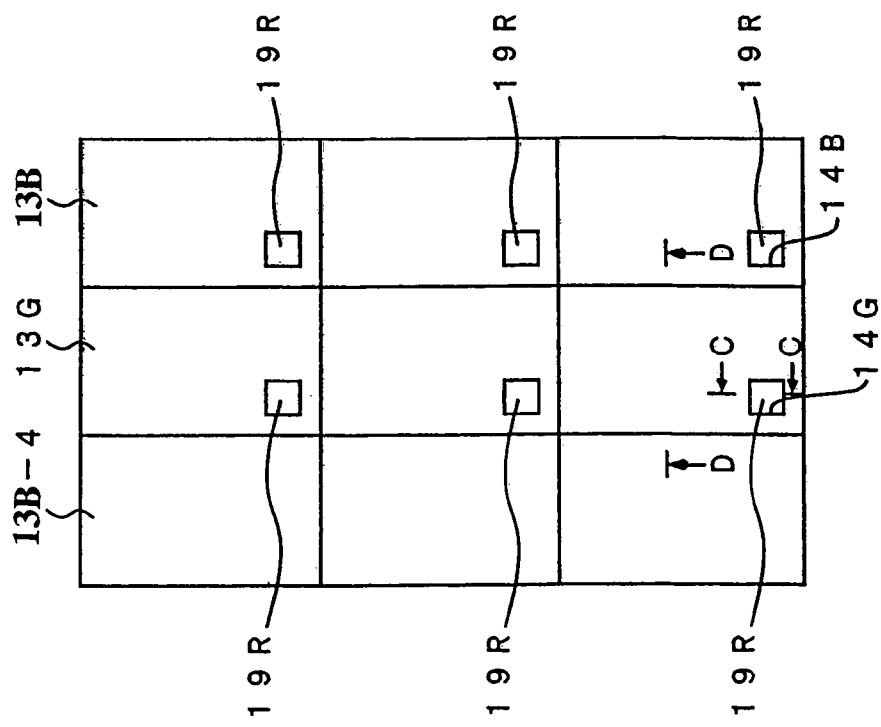

FIG. 27

| R | G | B | R | G | B |
|---|---|---|---|---|---|
| R | G | B | R | G | B |
| R | G | B | R | G | B |
| R | G | B | R | G | B |
| R | G | B | R | G | B |
| R | G | B | R | G | B |
| R | G | B | R | G | B |

FIG. 28

| R | G | B | R | G | B |
|---|---|---|---|---|---|
| G | B | R | G | B | R |
| B | R | G | B | R | G |
| R | G | B | R | G | B |
| G | B | R | G | B | R |
| B | R | G | B | R | G |
| R | G | B | R | G | B |

FIG. 30

| $^+$G | $^+$R | $^-$G | $^-$B | $^+$G | $^+$R | $^-$G | $^-$B |
|---|---|---|---|---|---|---|---|
| $^-$G | $^-$B | $^+$G | $^+$R | $^-$G | $^-$B | $^+$G | $^+$R |
| $^+$G | $^+$R | $^-$G | $^-$B | $^+$G | $^+$R | $^-$G | $^-$B |
| $^-$G | $^-$B | $^+$G | $^+$R | $^-$G | $^-$B | $^+$G | $^+$R |
| $^+$G | $^+$R | $^-$G | $^-$B | $^+$G | $^+$R | $^-$G | $^-$B |
| $^-$G | $^-$B | $^+$G | $^+$R | $^-$G | $^-$B | $^+$G | $^+$R |
| $^+$G | $^+$R | $^-$G | $^-$B | $^+$G | $^+$R | $^-$G | $^-$B |
| $^-$G | $^-$B | $^+$G | $^+$R | $^-$G | $^-$B | $^+$G | $^+$R |

COLOR FILTER SUBSTRATE, MANUFACTURING METHOD OF COLOR FILTER SUBSTRATE, ACTIVE MATRIX TYPE LIQUID CRYSTAL DISPLAY, AND MANUFACTURING METHOD OF ACTIVE MATRIX TYPE LIQUID CRYSTAL DISPLAY

CROSS-REFERENCE TO RELATED APPLICATION

This application is a Continuation Application of U.S. application Ser. No. 09/981,065, filed on Oct. 16, 2001, abandoned.

BACKGROUND OF THE INVENTION

1. Field of the Invention

The present invention relates to a color filter built in a liquid crystal display panel, a manufacturing method thereof, an active matrix type liquid crystal display provided with the color filter, and a manufacturing method thereof, and especially relates to a color filter, a manufacturing method thereof, an active matrix type liquid crystal display, and a manufacturing method thereof preferable for driving in IPS (In-Plane-Switching) mode.

2. Description of the Related Art

An active matrix type liquid crystal display is constituted by adhering two substrates together, and providing liquid crystal between them. FIG. 1A and FIG. 1B show a CF substrate in a conventional active matrix type liquid crystal display, and FIG. 1A is a schematic showing a pattern of color filters, and FIG. 1B is a schematic showing a pattern of a black matrix. FIG. 2 is a schematic of a TFT substrate in a conventional active matrix type liquid crystal display of IPS mode. FIG. 3A is a section view along an E-E line in FIG. 1 and FIG. 2, and FIG. 3B is a section view along an F-F line in FIG. 1 and FIG. 2.

A conventional liquid crystal display holds liquid crystal 103 between two substrates 101 and 102 as described above. Of the two substrates, color filters are formed on the substrate 101 as described later, and thin film transistors (TFT's) are formed on the other substrate 102 as described later. Generally, the substrate 101 is referred as a color filter substrate (CF substrate), and the substrate 102 is referred as a TFT substrate.

In the TFT substrate 102, gate electrodes 122 and common electrodes 123 extending in the horizontal direction are formed on a first transparent substrate 121. The common electrodes 123 include two linear parts 123a extending linearly in the horizontal direction, and connecting parts 123b extending in the vertical direction between the linear parts 123a, and mutually connecting the linear parts 123a in the pixels. Each of the connecting parts 123b is formed as shapes bending in the same direction at intermediate parts to turn the liquid crystal in two directions. An inter-layer insulating film 124 for covering the gate electrodes 122 and the common electrodes 123 is formed all over the surface.

An amorphous silicon layer 125 and an n+ amorphous silicon layer 126 are sequentially formed at positions aligned to the gate electrode 122 at an equal interval on the inter-layer insulating film 124. Also, data lines 127 extending vertically, pixel electrodes 128 placed in the pixels, drain electrodes 129, which are connected to the data lines 127 and extend to the n+ amorphous silicon layer 126, and source electrodes 130, which are connected to the pixel electrodes 128 and extend to the n+ amorphous silicon layer 126 on the inter-layer insulating film 124. The pixel electrode 128 includes two linear parts 128a extending linearly in the horizontal direction, and connecting parts 128b extending in the vertical direction between the linear parts 128a, and connecting the linear parts 128a each other. Each of the connecting parts 128b is formed as shapes bending in the same direction as the connecting parts 123b of common electrode 123 at intermediate parts to turn the liquid crystal in two directions. A passivation film 131 covering them is formed. An orientation film 132 is formed on the passivation film 131. A rubbing direction of the orientation film 132 is vertical as indicated by an arrow 133.

A polarization plate 134 is adhered on a rear side of the first transparent substrate 121.

The layers formed on the inter-layer insulating film 124 are indicated with a hatch pattern in FIG. 2.

In the CF substrate 101, a black matrix 112 is formed on a second transparent substrate 111. Rectangular openings 112a are formed at areas aligned to the pixel electrodes 128, or, in other words the center of pixels on the black matrix 112. Red color filters 113R, green color filters 113G, and blue colors filter 113B are arranged as stripes on the black matrix 112. Though the color filters are in contact with each other in the vertical and horizontal directions for simplicity in FIG. 1, color filters of the same colors are in contact with each other in the vertical direction, gaps are formed between filters of different colors, and they are not in contact with each other in the horizontal direction as shown in FIG. 3B.

Then, a flattening film 115 and an orientation film 116 for covering the color filters 113R, 113G, and 113B are formed sequentially. A rubbing direction of the orientation film 116 is vertical, and is the same as that of the orientation film 132.

A conductive layer 117 and a polarization plate 118 are adhered on a rear side of the second transparent substrate 111.

The conventional active matrix type liquid crystal display constituted in this way is driven in the IPS (In-Plane-Switching) mode. When a voltage applied to the data line 127 is transferred to the pixel electrode 128 through the drain electrode 129, the amorphous silicon layers 125 and 126, and the source electrode 130, electric field is generated between the pixel electrode 128 and the common electrode 123, and the liquid crystal 103 rotates. As the result, light emitted from a backlight (not shown) passes through the color filter, and colored light is emitted from the polarization plate 132. Since the connecting parts 123b and 128b have the shapes bending in the same direction, the liquid crystal 103 rotates in different directions above and below them. Thus, a yellowish image is hardly present when viewed in a tilted direction to a screen.

The color filter has various patterns. FIG. 4 shows a schematic of a conventional color filter pattern provided independently. In this conventional color pattern, color filters on neighboring pixels are separated in the vertical direction as well as the horizontal direction. The color filters of different colors 136R, 136G, and 136B are separated each other, and the color filters of same colors are separated as well.

There is twisted nematic (TN) type in addition the IPS mode among the active matrix type liquid crystal displays.

FIG. 5 shows a schematic for a TFT substrate in a conventional active matrix type liquid crystal display of the TN mode. FIG. 6A is a section view along an I-I line in FIG. 5, and FIG. 6B is a section view along a J-J line in FIG. 5. For the liquid crystal display of TN mode shown in FIG. 5 and FIG. 6, constituting elements equivalent to those in the liquid crystal display of IPS mode shown in FIG. 2 and FIG. 3 have the same numerals, and are not provided with detailed descriptions.

A common electrode 140 is formed between the flattening film 115 and the orientation film 116 in CF substrate 101 of TN mode. The conductive film 117 is not formed on the rear side of second transparent substrate 111, and the polarization plate 118 is directly adhered. The common electrode 123 is not formed on the first transparent substrate 121, and rectangular plate-like pixel electrodes 141 are formed on the passivation film 131 in TFT substrate 102. The pixel electrode 141 is connected to the source electrode 130 through a contact hole 142 formed on the passivation film 131.

In the conventional liquid crystal display, the entire light which reaches the color filter substrate is not emitted outside, and a part of it is reflected by the color filter, and another part of it is reflected by the black matrix. The reflected light enters the amorphous silicon layer constituting the TFT. FIG. 7 is a schematic section view showing the light coming into the amorphous silicon layer. As shown in FIG. 7, the reflected light 137 from the color filter, and the reflected light 138 from the black matrix comes into the amorphous silicon layer 125, and photocurrent flows in the amorphous silicon layer, thereby fluctuating characteristic of the amorphous silicon layer as the result. FIG. 8 is a chart showing the fluctuation of TFT characteristic.

By design, it is assumed that a relation between gate voltage Vg and drain current Id (TFT characteristic) shown in a solid line is obtained, and OFF voltage is set as negative voltage providing the minimum value of drain current Id, and ON voltage is set as appropriate positive voltage. As the operation time extends, the TFT characteristic fluctuates because of the cause described above. More specifically, a shift toward the positive direction of gate voltage Vg is present as indicated by a broken line in FIG. 8. As the result, the gate current Id at OFF voltage increases, and the gate current Id at ON voltage decreases. Thus, a predetermined brightness is not obtained at the pixels.

The fluctuation of characteristic of amorphous silicon layer depends on the intensity of light coming into it, and the intensity of light largely varies according to the reflectivity of color filter. For example, the reflectivity of green color filter is about 1.01, and the reflectivity of blue color filter is about 1.02 while the reflectivity of red color filter is assumed to be 1. When incident light is coming into the amorphous silicon layer for an extended period, the TFT characteristic varies according to the colors, thereby generating a problem such as residual image, color unevenness, and flicker.

A liquid crystal display including a heterochromatic three-layer structure as a color filter just above a TFT is proposed to prevent fluctuation of the characteristic of amorphous silicon layer constituting the TFT caused by reflected light reflected from a color filter substrate (Publication of unexamined patent application Ser. No. Hei 6-331975). FIG. 9 is a schematic sectional view showing a conventional CF substrate and liquid crystal around it where three layers of color filters are laminated on a part opposing to a TFT. A light-shielding film 151 is formed in an area opposing to the TFT on a transparent substrate 150, a red color filter 152R is formed in a red pixel area 155R, and a green color filter 152G is formed in a green pixel area 155G. A blue color filter 152B is formed on a blue pixel area (not shown) on the transparent substrate 150 as well. The red color filter 152R, the blue color filter 152B, and the green color filter 152G are laminated sequentially on the light-shielding film 151. The thickness of the color filters are about 1 μm, respectively.

With the liquid crystal display including this structure, the color filter absorbs most of the incident light into the color filter, thereby reducing reflected light coming into the amorphous silicon layer, resulting in restraining the fluctuation of TFT characteristic.

When the three-layer color filter is laminated in this way, a step of about 2 μm of a film thickness difference corresponding to two color layers (color filters) is generated between the laminated part and the center of pixel in the color filter substrate. When this step is generated, liquid crystal 153 is aligned along a wall of the step, thereby generating an uneven alignment direction. As the result, light 154, which is not intended to pass, passes through a neighborhood of the wall of step.

A liquid crystal display where independent colored films are formed on pixels is proposed to provide high brightness by increasing the intensity of out-going light (Publication of unexamined patent application Ser. No. 2000-89248).

Though, for a liquid crystal display (LCD) with dot inversion driving, if a color layer with the same color is formed continuously at least at parts, a flicker is hardly recognizable since plus charge and minus charge of the color layer cancel each other, the plus charge and the minus charge do not cancel each other in a LCD as one disclosed in the Publication of unexamined patent application No. 2000-89248, where a color layer with the same color is formed separately, resulting in a strong flicker.

SUMMARY OF THE INVENTION

It is an object of the present invention to provide a color filter substrate for preventing a fluctuation of TFT characteristic among pixels without generating unnecessary transmitted light to prevent residual image, color unevenness and flicker, a manufacturing method of the color filter substrate, an active matrix type liquid crystal display provided with the same color filter, and a manufacturing method of the active matrix type liquid crystal display.

According to one aspect of the present invention, a color filter substrate comprises a transparent substrate and color filters of three colors with an opening provided at every pixel on the transparent substrate. Color filters neighboring to each other in one direction are connected to each other. A thin film transistor is to oppose to the opening. Data lines are to be aligned along said one direction.

In the present invention, the opening is provided in a predetermined area of each of the color filters, thereby almost equalizing the intensity of reflected light among the pixels when the light comes into the color filter substrate from a backlight or the like. Thus, when the reflected light comes into the TFT's, the fluctuation of their characteristic becomes constant, thereby restraining variations of the TFT characteristic. As the result, the generation of residual image, color unevenness and flicker is restrained when the LCD is operated for a long period. This effect is especially large when this constitution is applied to a liquid crystal display driven in IPS mode. Also, there is a small change in cell gap caused by the change in thickness of parts opposing to TFT's on the color filter substrate, thereby almost evenly aligning the liquid crystal, resulting in preventing a generation of unnecessary transmitted light. Further, since the color filters are continuous in one direction along which the data lines are to extend, when the color filters are charged, charges are canceled each other between the color filters, and disappear in dot reverse driving, thereby hardly generating residual image, color unevenness, and flicker.

According to another aspect of the present invention, a manufacturing method of a color filter substrate comprises the steps of: forming a black matrix on a transparent substrate; forming first color filters with a first opening in all the pixels displaying a first color on the black matrix, a thin film transistor provided at every pixel displaying the first color being to oppose to the first opening; forming second color filters with a second opening in all the pixels displaying a second color on the black matrix, a thin film transistor provided at every pixel displaying the second color being to oppose to the second opening; and forming third color filters with a third opening in all the pixels displaying a third color on the black matrix, a thin film transistor provided at every pixel displaying the third color being oppose to the third opening.

According to further another aspect of the present invention, a manufacturing method of a color filter substrate comprises the steps of: forming a black matrix on a transparent substrate; forming first color filters in all the pixels displaying a first color, in a part of all the pixels displaying a second color, and in a part of all the pixels displaying a third color on the black matrix, a thin film transistor provided at every pixel displaying the second color being to oppose to the part of the pixels displaying the second color, and a thin film transistor provided at every pixel displaying the third color being to oppose to the part of the pixels displaying the third color; forming second color filters with a second opening in all the pixels displaying the second color on the black matrix, the thin film transistor provided at every pixel displaying the second color being to oppose to the second opening; and forming third color filters with a third opening in all the pixels displaying a third color on the black matrix, the thin film transistor provided at every pixel displaying the third color being oppose to the third opening.

According to further another aspect of the present invention, an active matrix type liquid crystal display comprises any of the color filter substrates described above.

According to further another aspect of the present invention, a manufacturing method of an active matrix type liquid crystal display comprises the steps of: manufacturing a color filter substrate based on a method described in claim 5; and adhering a substrate with the thin film transistors and the color filter substrate.

BRIEF DESCRIPTION OF THE DRAWINGS

FIG. 1 shows a color filter (CF) substrate for a conventional active matrix type liquid crystal display.

FIG. 16 is a schematic showing a CF substrate for an active matrix type liquid crystal display according to a fourth embodiment of the present invention.

FIG. 27 is a schematic showing a stripe-like pattern of pixels.

FIG. 28 is a schematic showing a mosaic-like pattern of pixels.

FIG. 30 is a schematic showing a driving method while two pixels are designated as one unit.

DETAILED DESCRIPTION OF THE PREFERRED EMBODIMENTS

Figure 2:
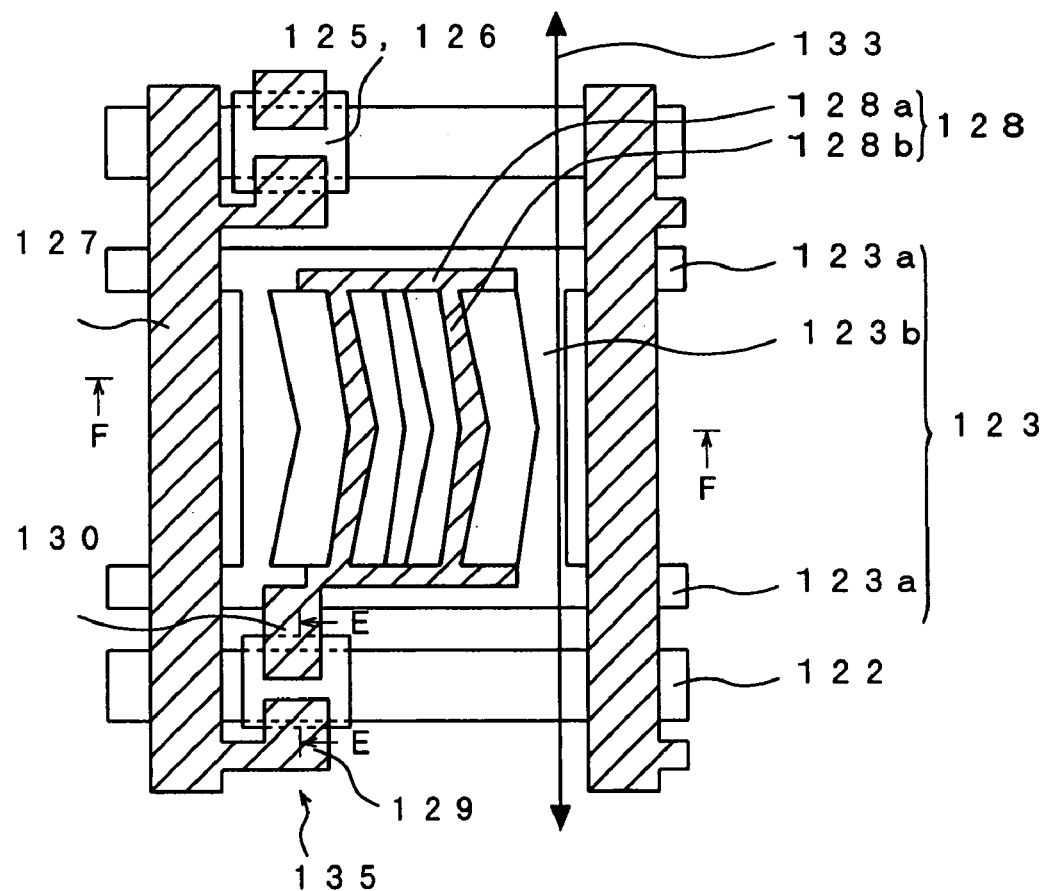
FIG. 2 is a schematic showing a TFT substrate for a conventional active matrix type liquid crystal display of IPS mode.
Figure 3A:
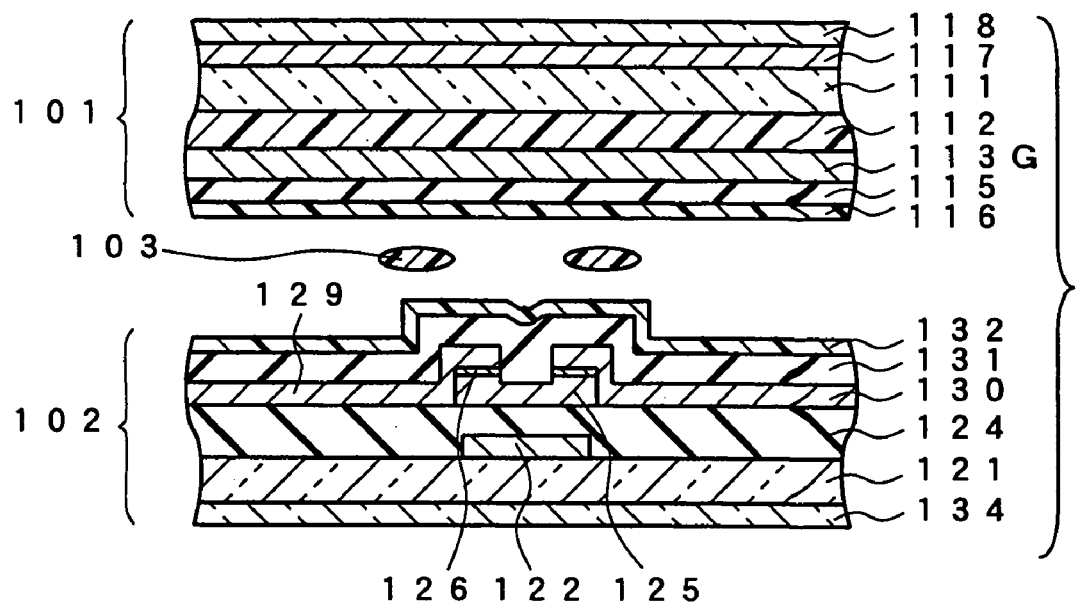
FIG. 3A is a section view along an E-E line in FIG. 1 and FIG. 2.
Figure 3B:
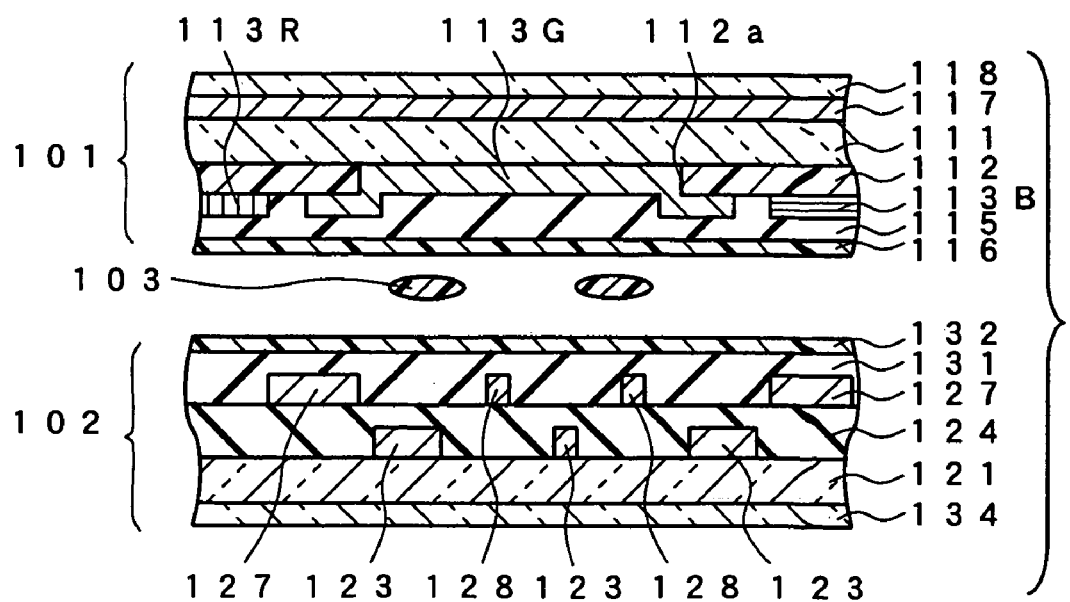
FIG. 3B is a section view along an F-F line in FIG. 1 and FIG. 2.
Figure 4:
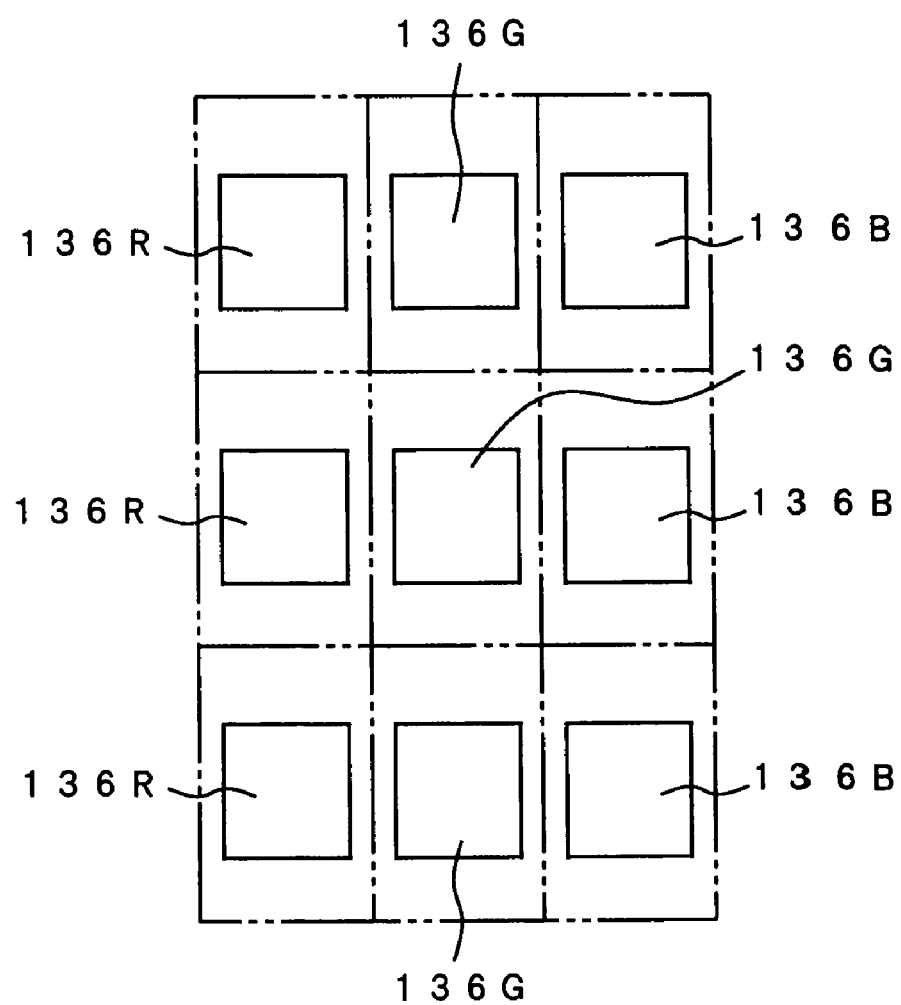
FIG. 4 is a schematic showing a conventional color filter pattern provided separately.
Figure 5:
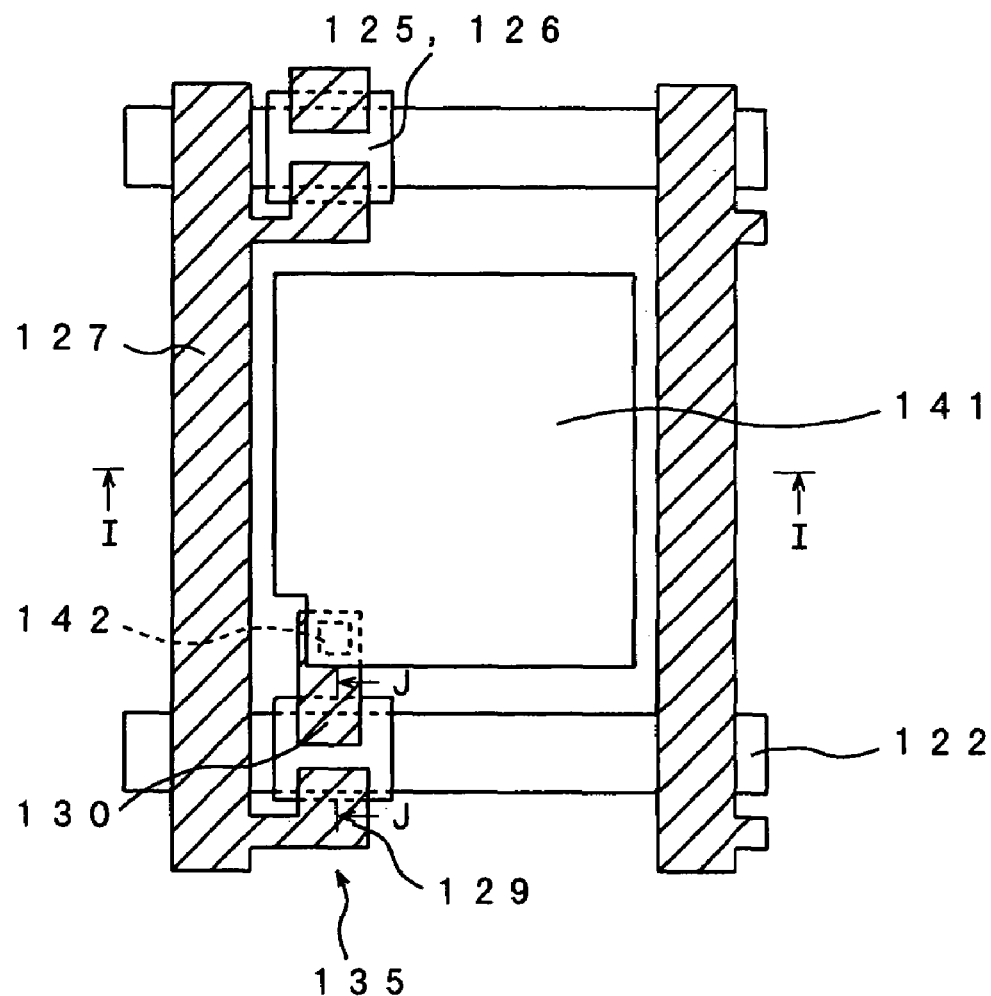
FIG. 5 is a schematic showing a TFT substrate for a conventional active matrix type liquid crystal display of TN mode.
Figure 6A:
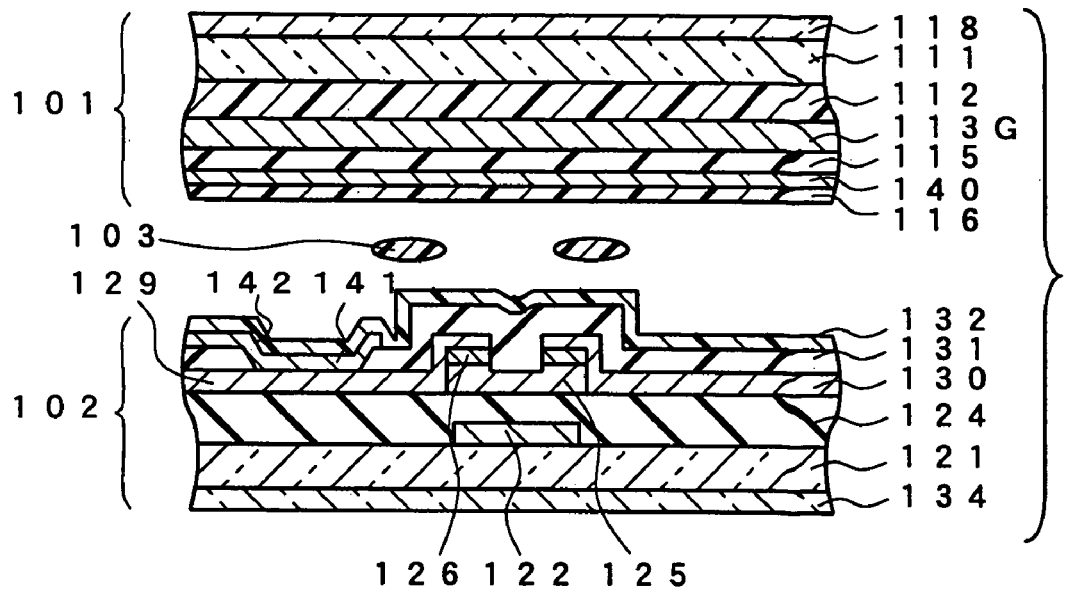
FIG. 6A is a section view along an I-I line in FIG. 5.
Figure 6B:
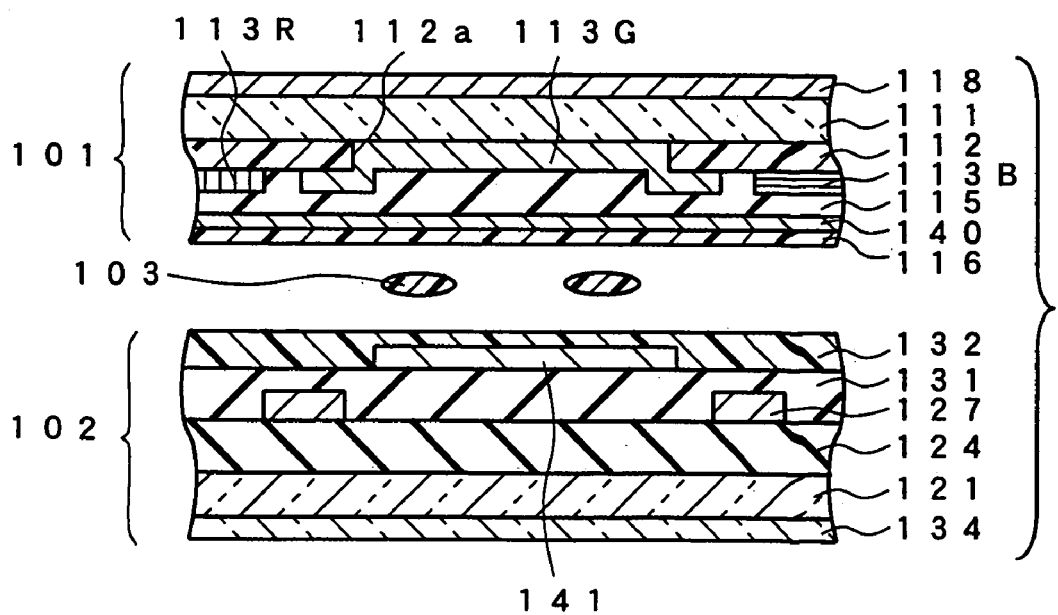
FIG. 6B is a section view along a J-J line in FIG. 5.
Figure 7:
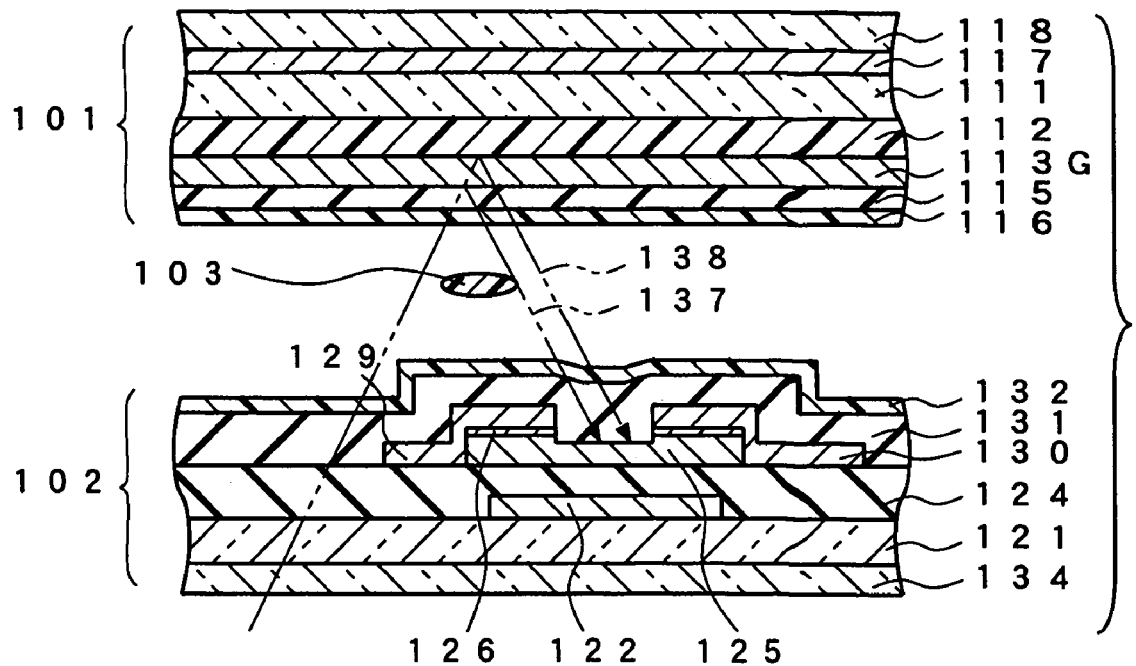
FIG. 7 is a schematic section view showing incident light to an amorphous silicon layer.
Figure 8:
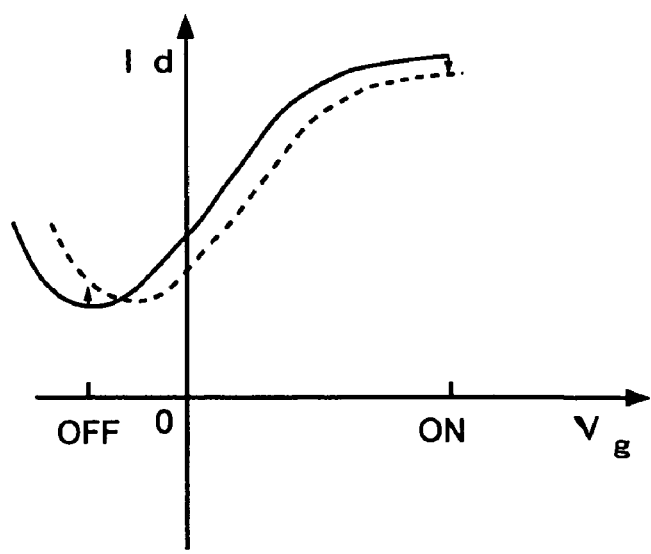
FIG. 8 is a chart showing a fluctuation of TFT characteristic.
Figure 9:
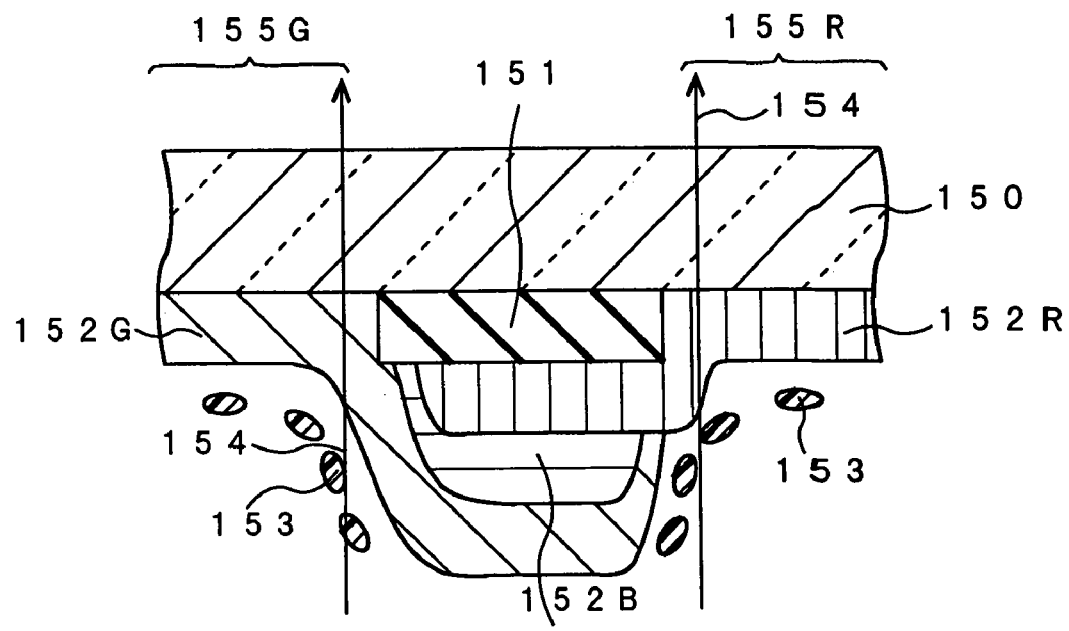
FIG. 9 is a schematic section view showing a conventional CF substrate where three layers of color filters are laminated on a part opposing to a TFT, and liquid crystal around it.
Figure 10B:
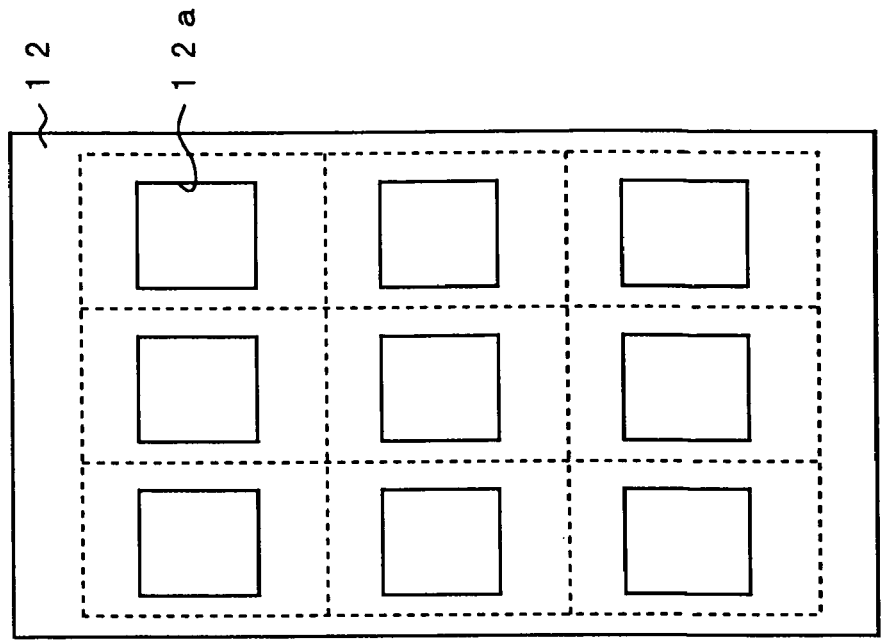
FIG. 10 is a schematic showing a CF substrate of an active matrix type liquid crystal display according to a first embodiment of the present invention.
Figure 10A:
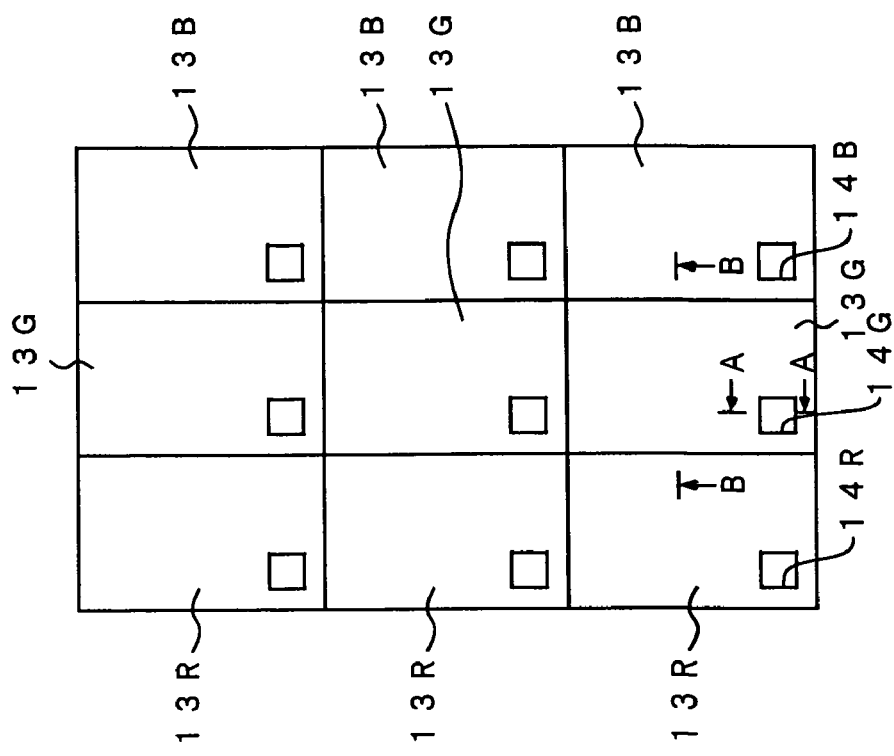
Figure 11:
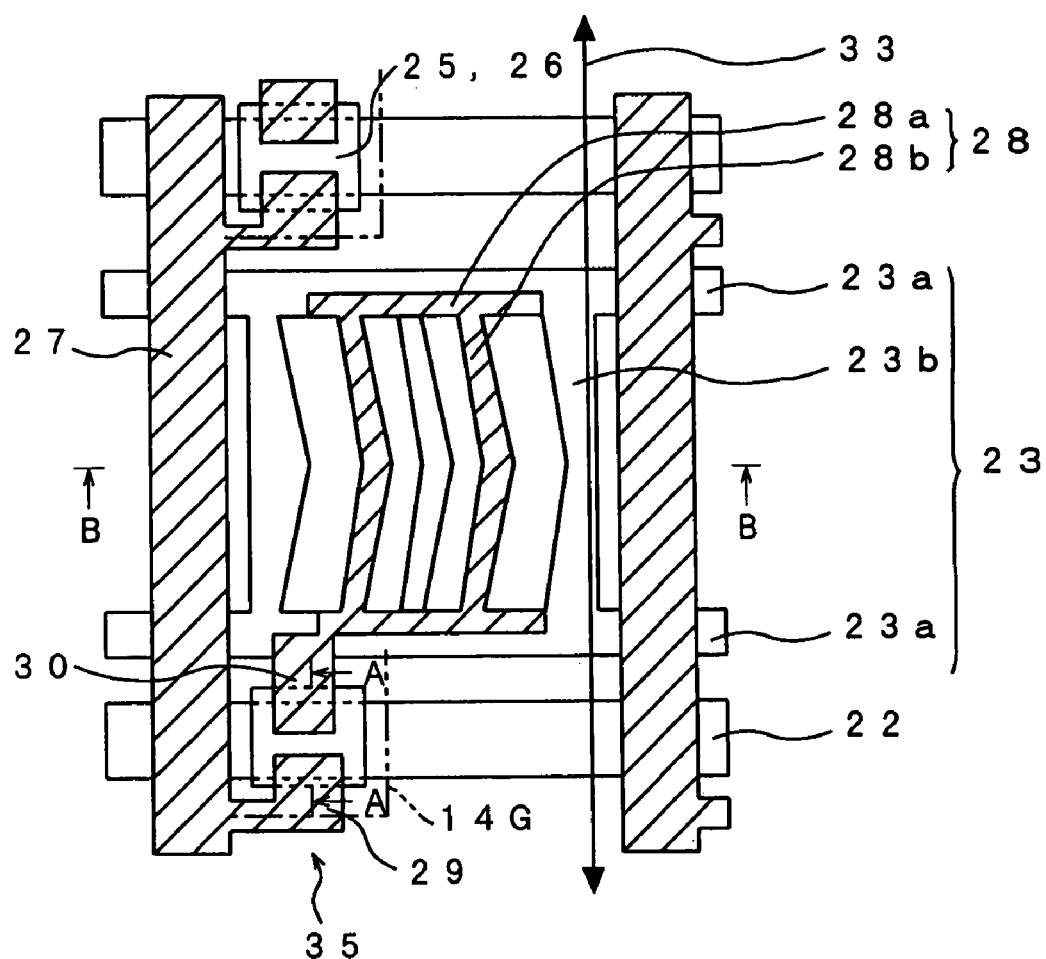
FIG. 11 is a schematic showing a TFT substrate of the active matrix type liquid crystal display according to the first embodiment.
Figure 12A:
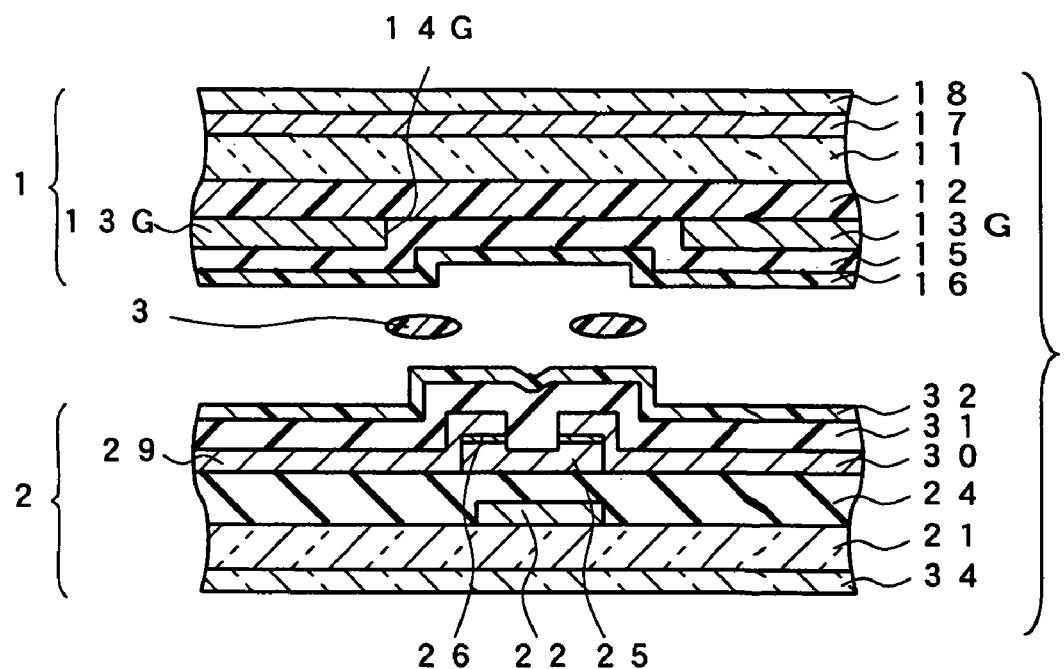
FIG. 12A is a section view along an A-A line in FIG. 10 and FIG. 11.
Figure 12B:
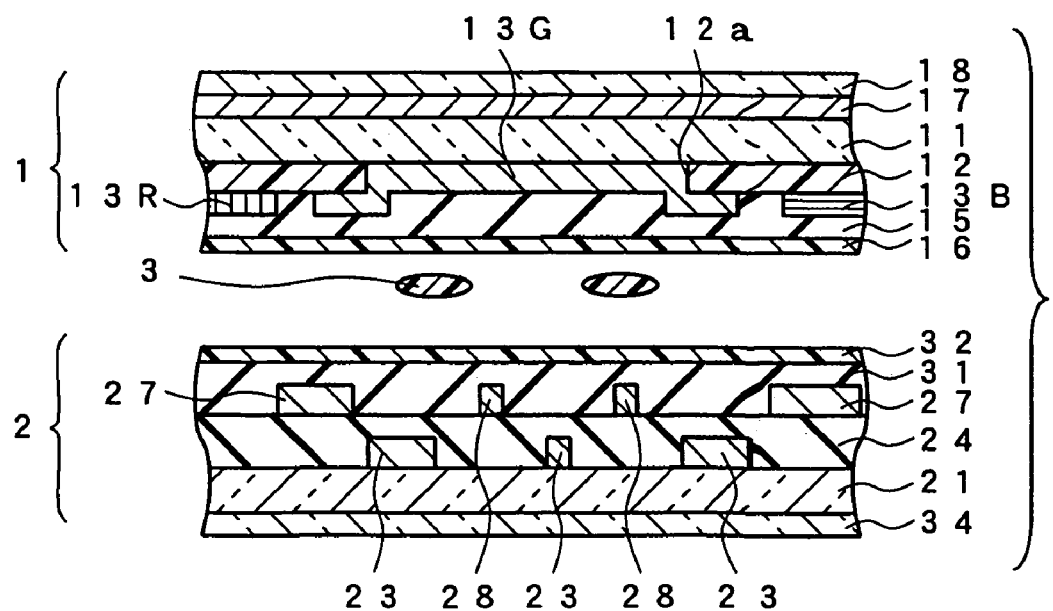
FIG. 12B is a section view along a B-B line in FIG. 10 and FIG. 11.

The following section specifically describes preferred embodiments of the present invention while referring to accompanied Figures. FIG. 10A and FIG. 10B show a CF substrate of an active matrix type liquid crystal display according to a first embodiment of the present invention. FIG. 10A is a schematic showing a pattern of color filters, and FIG. 10B is a schematic showing a pattern of a black matrix. FIG. 11 is a schematic showing a TFT substrate of an active-matrix type liquid crystal display according to the first embodiment. FIG. 12A is a section view along an A-A line in FIG. 10 and FIG. 11, and FIG. 12B is a section view along a B-B line in FIG. 10 and FIG. 11.

In the first embodiment, as described in FIG. 1, liquid crystal 3 is held between a CF substrate 1 and a TFT substrate 2.

In the TFT substrate 2, gate electrodes 22 and common electrodes 23 extending in the horizontal direction is formed on a first transparent substrate 21. The common electrodes 23 include two linear parts 23a extending linearly in the horizontal direction, and three connecting parts 23b extending in the vertical direction between the linear parts 23a, and connecting the linear parts 23a each other in the pixels. Each of the connecting parts 23b is formed in shapes bending in the same direction at intermediate parts for rotating the liquid crystal in two directions. An inter-layer insulating film 24 for covering the gate electrodes 22 and the common electrodes 23 is formed all over the surface.

An amorphous silicon layer 25 and an $n^+$ amorphous silicon layer 26 are sequentially formed at positions aligned to the gate electrodes 22 at an equal interval on the inter-layer insulating film 24. Also, data lines 27 extending vertically, pixel electrodes 28 placed in the pixels, drain electrodes 29, which are connected to the data lines 27 and extend to the $n^+$ amorphous silicon layer 26, and source electrodes 30, which are connected to the pixel electrodes 28 and extend to the $n^+$ amorphous silicon layer 26 on the inter-layer insulating film 24. The pixel electrode 28 includes two linear parts 28a extending linearly in the horizontal direction, and connecting parts 28b extending in the vertical direction between the linear parts 28a, and connecting the linear parts 28a each other. Each of the connecting parts 28b is formed as shapes bending in the same direction as the connecting parts 23b of common electrode 23 at intermediate parts to turn the liquid crystal in two directions. A passivation film 31 is formed to cover the amorphous silicon layer 25, the $n^+$ amorphous silicon layer 26, the data lines 27, the pixel electrodes 28, the drain electrodes 29, and the source electrodes 30. An orientation film 32 is formed on the passivation film 31. A rubbing direction of the orientation film 32 is substantially vertical as indicated by an arrow 33.

A polarization plate 34 is adhered on a rear side of the first transparent substrate 21.

The layers formed on the inter-layer insulating film 24 are indicated with a hatch pattern in FIG. 11.

In the CF substrate 1, a black matrix 12 is formed on a second transparent substrate 11. Rectangular openings 12a are formed at areas aligned to the pixel electrodes 28, or, in other words the center of the pixels on the black matrix 12. Red color filters 13R, Green color filters 13G, and Blue color filters 13B are arranged as stripes on the black matrix 12. Though FIG. 10 shows total of nine pixels where each three pixels of them has each color, a large number of pixels are formed in the present embodiment. Though color filters are in contact with each other in the vertical and horizontal directions for simplicity in FIG. 10, color filters with the same colors are in contact with each other in the vertical direction, gaps are formed between filters of different colors, and they are not in contact with each other in the horizontal direction as in FIG. 12B. Openings 14R, 14G, and 14B are respectively formed on positions which overlap TFT's 35, to the color filters 13R, 13G, and 13B.

Then, a flattening film 15 and an orientation film 16 for covering the color filters 13R, 13G, and 13B are formed sequentially. The rubbing direction of the orientation film 16 is vertical same as that of the orientation film 32.

A conductive layer 17 and a polarization plate 18 are adhered on a rear side of the second transparent substrate 11.

The following section describes the operation of active matrix type liquid crystal display according to the first embodiment.

For example, the liquid crystal display according to the present embodiment may be driven by dot inversion. Voltage corresponding to image data is applied to the data lines 27 while the gate electrodes 22 are being scanned sequentially. As the result, predetermined voltage is transferred to the pixel electrode 28 through the drain electrode 29 and the source electrode 30, electric field is generated between the pixel electrode 8 and the common electrode 23, and the liquid crystal 3 rotates to emit light from the pixel. Voltage in different polarities is transferred from the data lines 27 to neighboring pixels in both the vertical and horizontal direction.

Then, charges accumulated on the neighboring color filters are canceled and disappear between the neighboring color filters. Thus, residual image, color unevenness, and flicker generated by the charged color layers are prevented.

In the present embodiment, as in the conventional displays, light emitted from a backlight (not shown) is reflected on the CF substrate 1 by the rotation of liquid crystal 3, and comes into the amorphous silicon layer 25. The opening 14R, 14G or 14B is formed in the color filter in a position opposing to the amorphous silicon layer 25 in CF substrate 1, and there is the black matrix 12 under the orientation film 16 and the flattening film 15 in any pixel. Thus, the reflectivity of light is constant in color pixels of any color types, and the intensity of incident light to the amorphous silicon layer 25 is at the similar level. After the liquid crystal display is operated for a long period, even if the amorphous silicon layer 25 presents a change in quality, the degree of change is constant among different color types, thereby presenting no variation in the TFT characteristic. Thus, residual image, color unevenness, and flicker generated are prevented during an operation for a long period.

Though there are slight steps near areas opposing to TFT's 35 on the CF substrate 1, these steps are about equivalent to a single layer of color filter, and do not have a large effect on an alignment direction of the liquid crystal, thereby preventing unnecessary transmitted light from being generated.

The size of openings 14R, 14G, and 14B may be about a size which prevents the reflected light from the color filters from coming into the amorphous silicon layer 25. For example, an upper edge of the opening reaches the common electrode 23a, a lower edge and a side edge on one side reach the connection part between the drain electrode 29 and the data line 27, and the other edge extends from the amorphous silicon layer 25 as far as the side edge on the opposite side.

The following section describes a manufacturing method for the CF substrate 1 for the liquid crystal display according to the first embodiment having the structure described above. FIG. 13A to FIG. 13I are section views showing the manufacturing method of the liquid crystal display according to the first embodiment in the order of process.

Figure 13A:
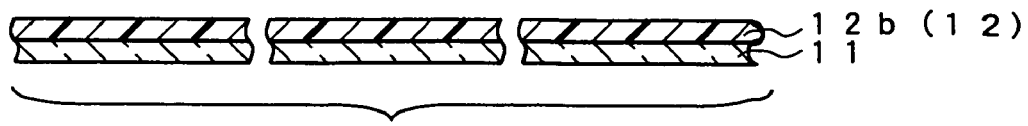
FIG. 13A to FIG. 13I are section views showing a manufacturing method of the liquid crystal display according to the first embodiment in the order of process.

An acryl resin layer 12b in which carbon is diffused is formed by coating on the second transparent substrate 11 as described in FIG. 13A. Then, openings are formed by patterning on areas aligned to pixels on the resin layer 12b, thereby forming the black matrix 12.

Figure 13B:
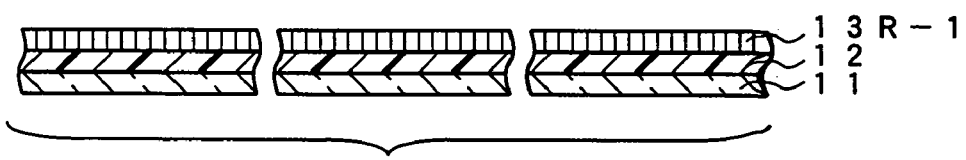

Then, a red resin layer 13R-1 is formed on the entire surface, and resist films (not shown) are formed on areas corresponding to red pixels on the resin layer 13R-1, with openings formed at areas opposing to TFT's of the red pixels as shown in FIG. 13B.

Figure 13C:
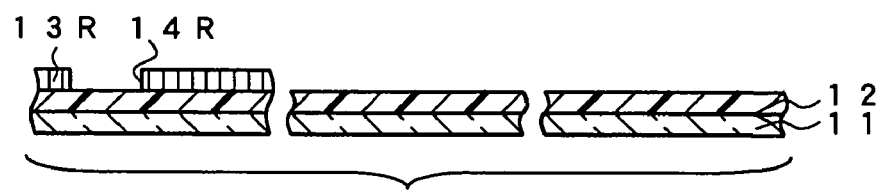

Then, the red resin layer 13R-1 is patterned by etching the red resin layer 13R-1 exposed from the openings to form the red color filters 13R as shown in FIG. 13C.

Figure 13D:
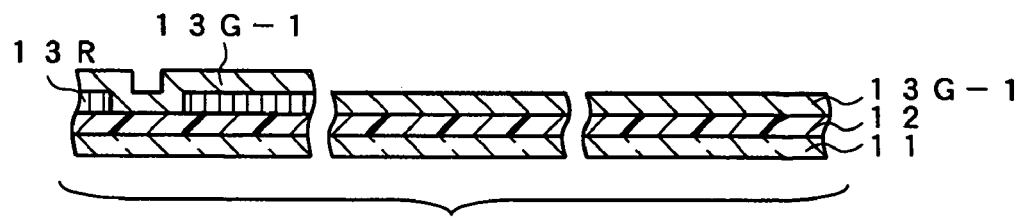

A green resin layer 13G-1 is formed on the entire surface, and resist films (not shown) are formed on areas corresponding to green pixels on the resin layer 13G-1, with openings formed at areas opposing to TFT's of the green pixels as shown in FIG. 13D.

Figure 13E:
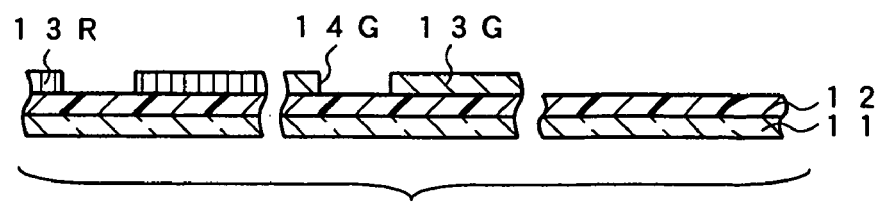

Then, the green resin layer 13G-1 is patterned by etching the green resin layer 13G-1 exposed from the openings to form the green color filters 13G as shown in FIG. 13E.

Figure 13F:
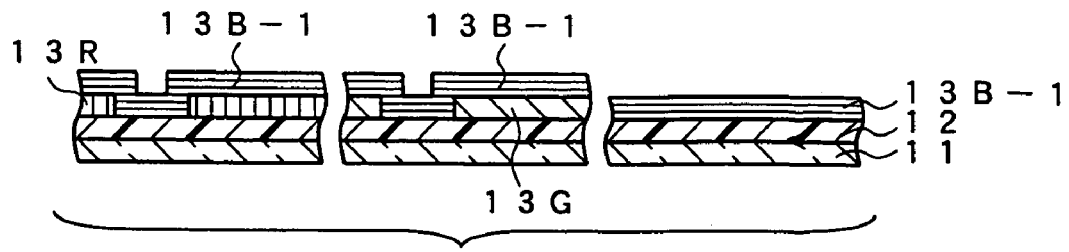

A blue resin layer 13B-1 is formed on the entire surface, and resist films (not shown) are formed on areas corresponding to blue pixels on the resin layer 13B-1, with openings formed at areas opposing to TFT's of the blue pixels as shown in FIG. 13F.

Figure 13G:
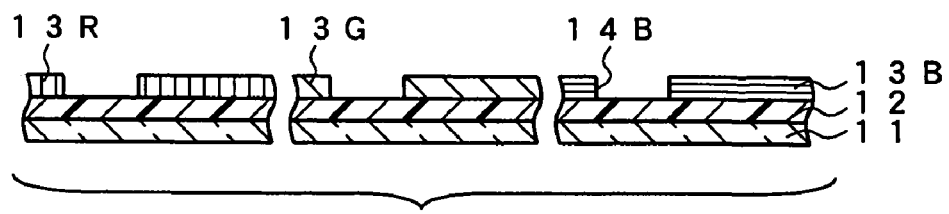

Then, the blue resin layer 13B-1 is patterned by etching the blue resin layer 13B-1 exposed from the opening to form the blue color filters 13B as shown in FIG. 13G.

Figure 13H:
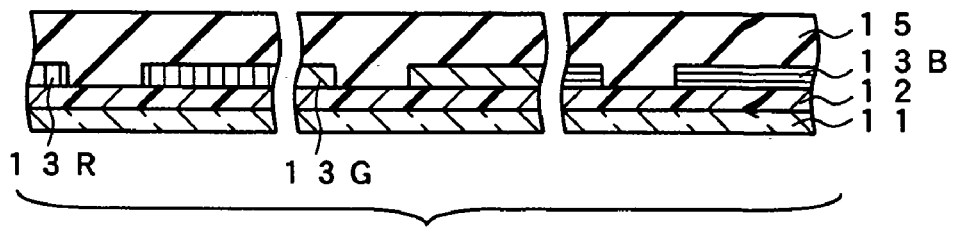
Figure 13I:
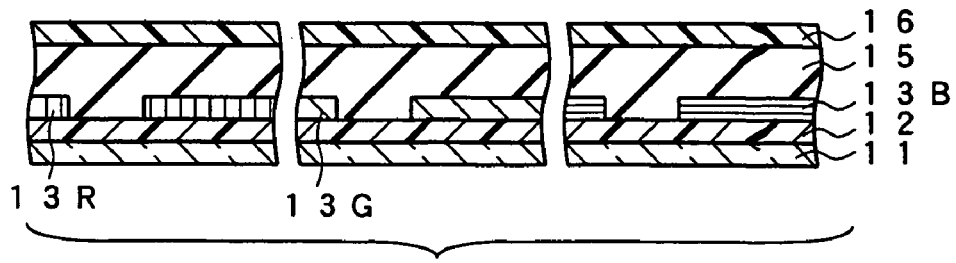

The CF substrate 1 is completed by forming the flattening film 15 on the entire surface as shown in FIG. 13H. Then, the orientation film 16 is pattern-formed by offset printing on the flattening film 15 as shown in FIG. 13I. The conductive layer (not shown) is formed on the rear side of second transparent substrate 11 before forming the black matrix 12. For manufacturing the active matrix type liquid crystal display, for example, the CF substrate 1 manufactured in the process described above, and the TFT substrate 2 are adhered together at a predetermined distance with a spacer or the like between them, and the liquid crystal is infused into the space. Then, an infusing hole for infusing the liquid crystal is sealed, and the polarization plates (not shown) are adhered to the CF substrate 1 and the TFT substrate 2.

With this manufacture, by only changing the pattern of resist films, it is possible to use an apparatus used for manufacturing conventional liquid crystal displays, and an increase of number of processes is avoided.

Figure 14:
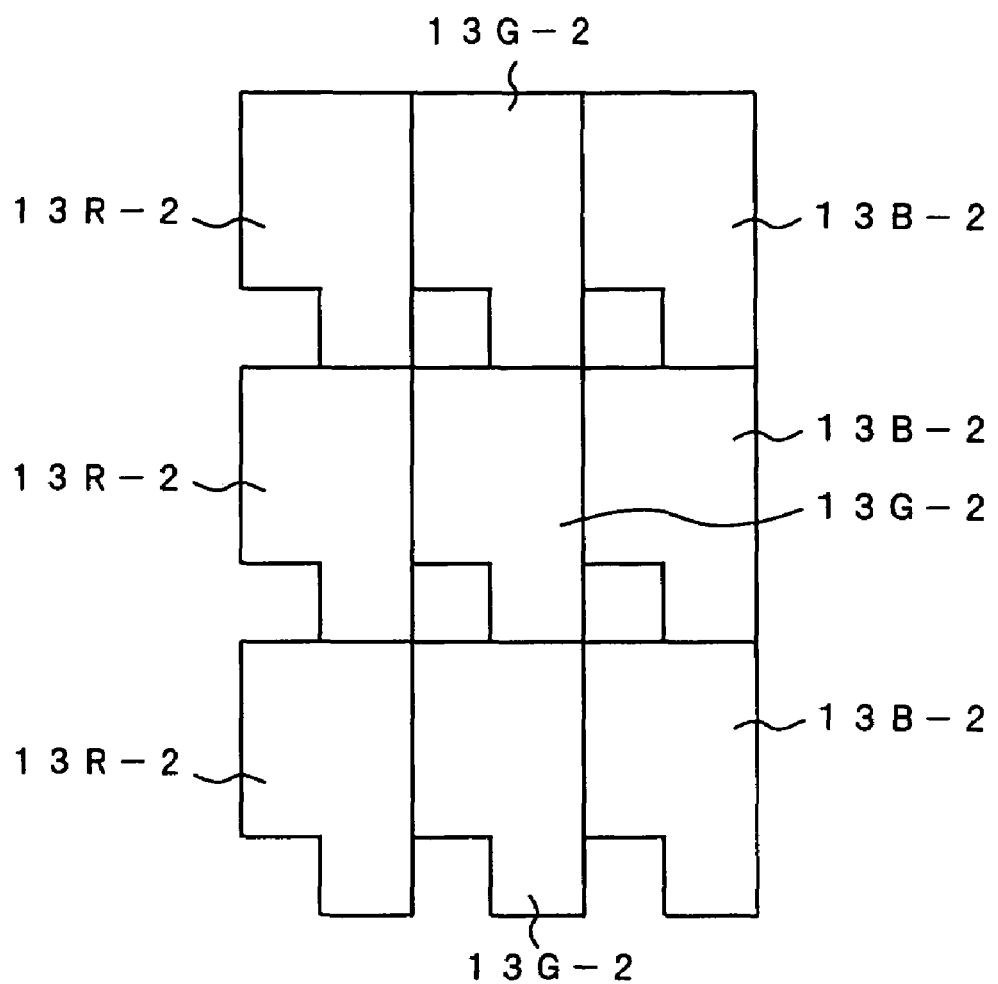
FIG. 14 is a schematic showing a pattern of color filters provided in a CF substrate for an active matrix type liquid crystal display according to a second embodiment of the present invention.

The following section describes a second embodiment of the present invention. FIG. 14 is a schematic showing a pattern of color filters provided on a CF substrate for an active matrix type liquid crystal display according to the second embodiment of the present invention. Constituting elements shown in FIG. 14 equivalent to those in the first embodiment shown in FIG. 10 have the same numerals, and are not provided with detailed descriptions.

The second embodiment are provided with color filters 13R-2, 13G-2, and 13B-2 which are cut at a corner including an area opposing to the TFT 35, and have a "L" shape. The color filters neighboring in the vertical direction are in contact with each other, and the color filters neighboring in the horizontal direction are not in contact with each other in the present embodiment as well.

In the second embodiment constituted as described above, the intensity of incident light to the amorphous layer 25 is constant in every pixels. When the color filters are charged, charges between the neighboring color filters in vertical direction cancel each other, and disappear. Thus, a generation of residual image, color unevenness, and flicker is restrained during an operation for a long period.

Figure 15:
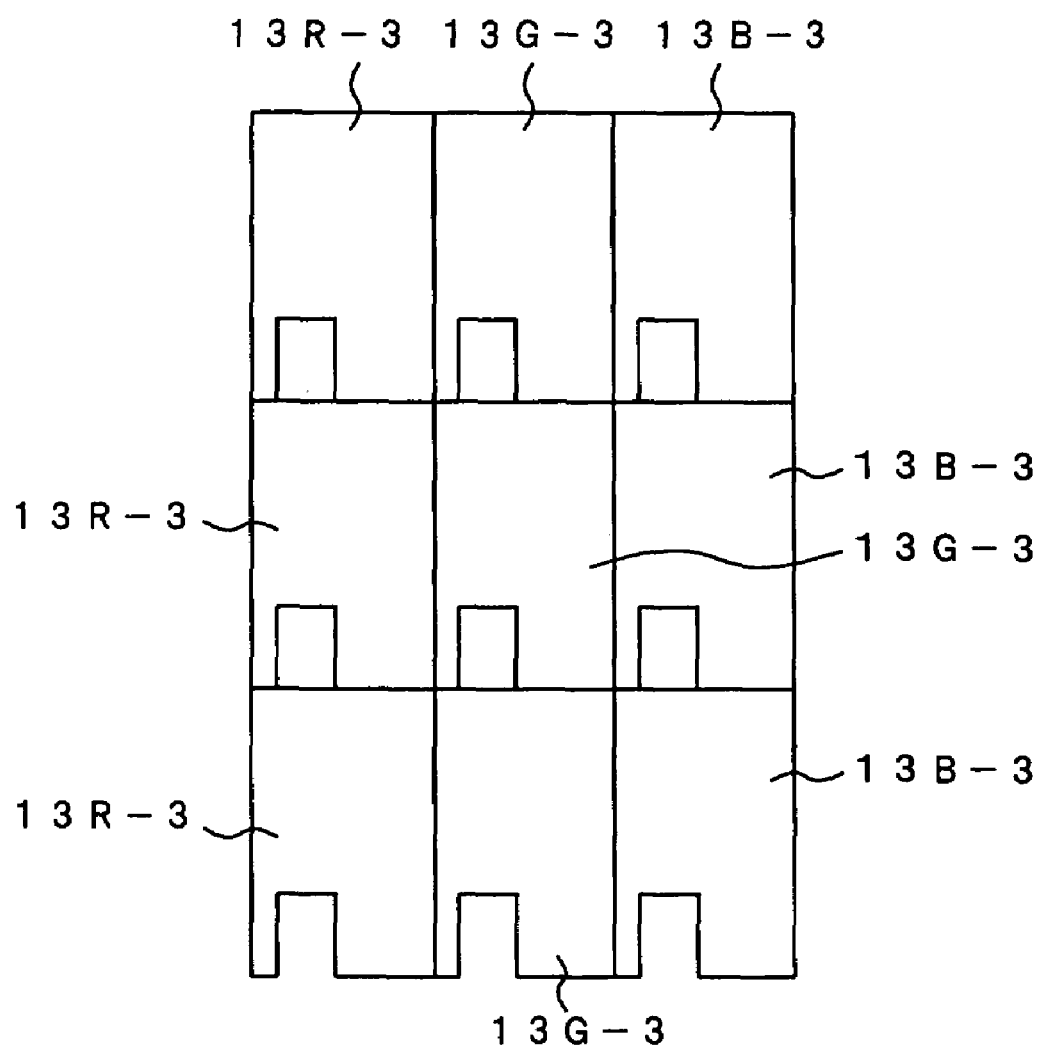
FIG. 15 is a schematic showing a pattern of color filters provided in a CF substrate for an active matrix type liquid crystal display according to a third embodiment of the present invention.

The following section describes a third embodiment of the present invention. FIG. 15 is a schematic showing a pattern of color filters provided on a CF substrate for an active matrix type liquid crystal display according to the third embodiment of the present invention. Constituting elements shown in FIG. 15 equivalent to those in the first embodiment shown in FIG. 10 have the same numerals, and are not provided with detailed descriptions.

Color filters 13R-3, 13G-3, and 13B-3, which include a cutout extending upward from a lower edge, and containing an area opposing to the TFT 35, and has a shape of inversed "U" are provided in the third embodiment. The color filters neighboring in the vertical direction are in contact with each other, and the color filters neighboring in the horizontal direction are not in contact with each other in the present embodiment as well.

In the third embodiment constituted as described above, the intensity of incident light to the amorphous layer 25 is constant in every pixels. When the color filters are charged, charges between the neighboring color filters in vertical direction cancel each other, and disappear. Thus, a generation of residual image, color unevenness, and flicker is restrained during an operation for a long period. Further, a contact area between neighboring color filters in the vertical direction in the present embodiment is larger than that in the second embodiment.

Figure 17:
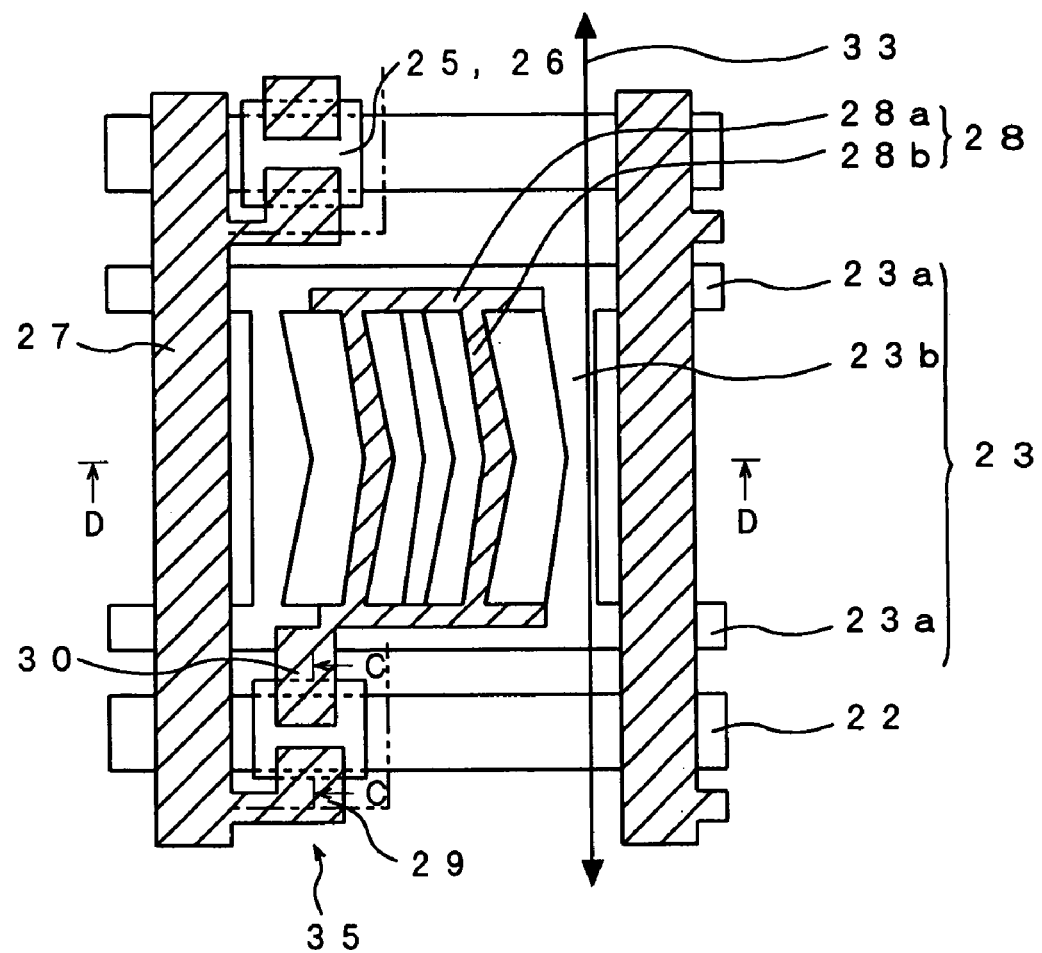
FIG. 17 is a schematic showing a TFT substrate for an active matrix type liquid crystal display according to the fourth embodiment.
Figure 18A:
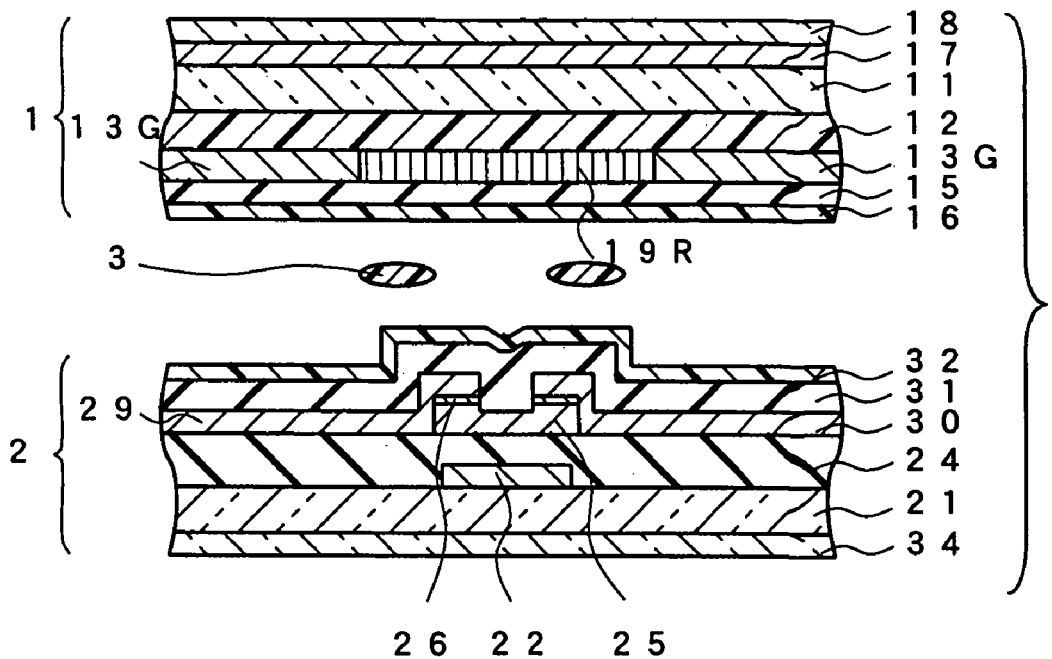
FIG. 18A is a section view along a C-C line in FIG. 16 and FIG. 17.
Figure 18B:
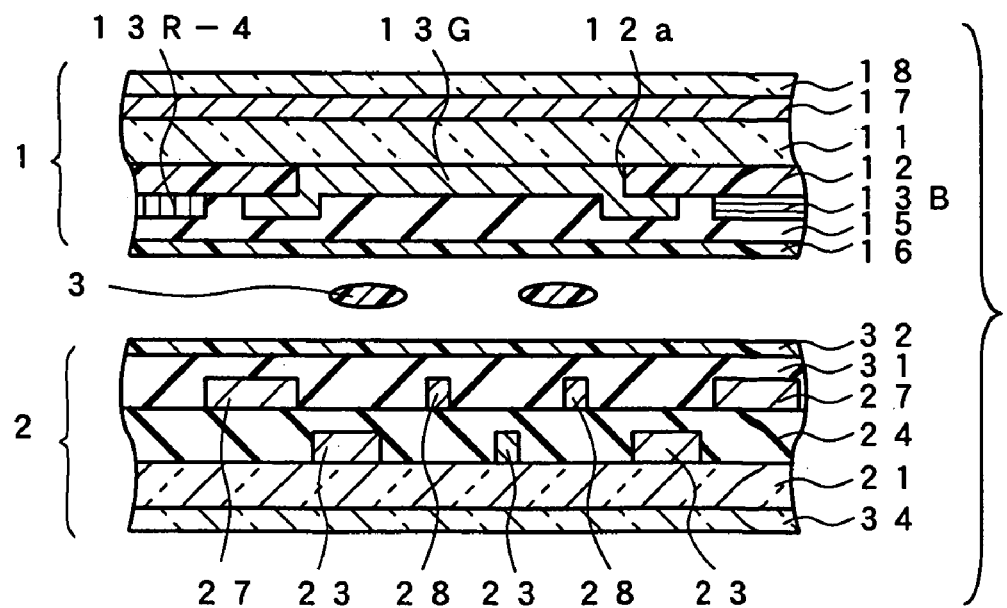
FIG. 18B is a section view along a D-D line in FIG. 16 and FIG. 17.

The following section describes a fourth embodiment of the present invention. FIG. 16A and FIG. 16B show a CF substrate for an active matrix type liquid crystal display according to the fourth embodiment of the present invention. FIG. 16A is a schematic showing a pattern of color filters, and FIG. 16B is a schematic showing a pattern of a black matrix. FIG. 17 is a schematic showing a TFT substrate for an active matrix type liquid crystal display according to the fourth embodiment. FIG. 18A is a section view along a C-C-line in FIG. 16 and FIG. 17, and FIG. 18B is a section view along a D-D line in FIG. 16 and FIG. 17. Constituting elements of the fourth embodiment shown in FIG. 16 to FIG. 18 equivalent to those in the first embodiment shown in FIG. 10 to FIG. 12 have the same numerals, and are not provided with detailed descriptions.

Though the openings 14G and 14B are formed respectively in areas opposing to the TFT's 35 on the color filters 13G and 13B, respectively, in the first embodiment, the red color filter 19R is provided in the openings 14G and 14B in the fourth embodiment. As the red color filter for the red pixels, a rectangular color filter 13R-4 without either an opening or a cutout formed is provided. The red color filter 19R is formed simultaneously with the red color filter 13R-4, for example, and has equivalent characteristics.

The layers formed on the inter-layer insulating film 24 are indicated with a hatch pattern in FIG. 17.

Light emitted from a backlight (not shown) is reflected on the CF substrate 1 by the rotation of liquid crystal 3, and comes into the amorphous silicon layer 25 as well in the fourth embodiment constituted as described above, the red color filter is provided as a lower layer under the orientation film 16, and the flattening film 15 at a position opposing to the amorphous silicon layer 25 of CF substrate 1 in any pixels. The reflectivity of light is constant in pixels of any color types, and the intensity of incident light to the amorphous silicon layer 25 is at the similar level. Thus, a generation of residual image, color unevenness, and flicker is prevented during an operation for a long period.

Since the color filter is formed on the entire surface, steps hardly exist near areas opposing to the TFT's 35 in the CF substrate 1. Thus, an alignment direction of the liquid crystal is maintained in a predetermined direction.

Though the red color filters are provided in the areas opposing to the TFT's 35 in the present embodiment since the red has the lowest reflectivity among the color filters of three colors, the color filter of another color may provide an equivalent effect if the color is unified on all pixels.

The following section describes a manufacturing method for the CF substrate 1 for the liquid crystal display according to the fourth embodiment having the structure described above. FIG. 19A to FIG. 19I are section views showing the manufacturing method of the liquid crystal display according to the fourth embodiment of the present invention in the order of process.

Figure 19A:
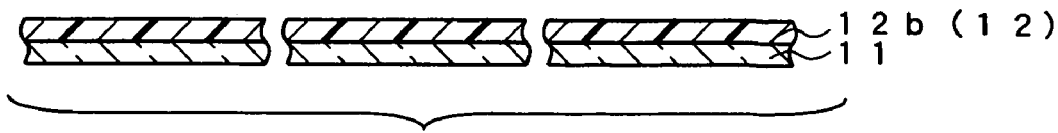
FIG. 19A to FIG. 19I are section views showing a manufacturing method of the liquid crystal display according to the fourth embodiment in the order of process.
Figure 19B:
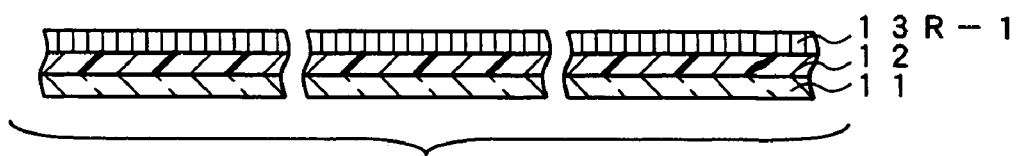

The black matrix 12 and the resin layer 13R-1 are formed on the second transparent substrate 11 in the same manner as in the first embodiment as shown in FIG. 19A and FIG. 19B. Then a resist film (not shown) covering areas opposing to the TFT's on the green pixels and the blue pixels, and the entire area of red pixels is integrally formed on the resin layer 13R-1.

Figure 19C:
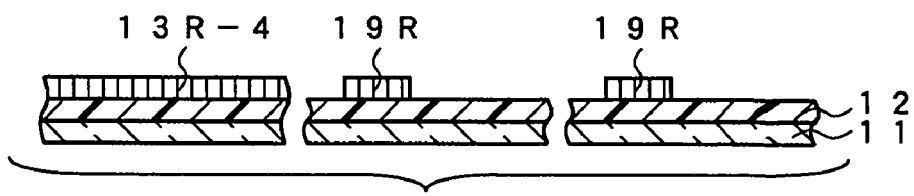

Red color filters 13R-4 and 19R are formed by etching the red resin layer 13R-1 for patterning as shown in FIG. 19C.

Figure 19D:
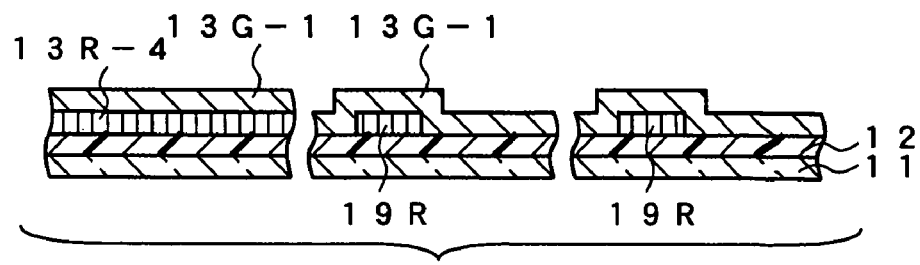

Then, the green resin layer 13G-1 is formed on the entire surface as shown in FIG. 19D, and resist films (not shown) is formed with openings formed on areas aligned to the red color filters 19R on the green pixels on an areas corresponding to green pixels on the resin layer 13G-1.

Figure 19E:
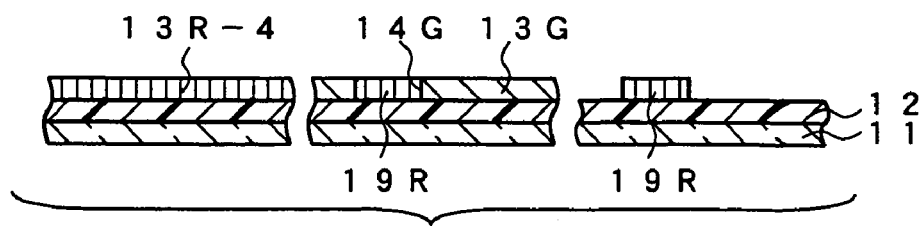

Then, the green color filters 13G with the openings 14G are formed by etching the resin layer 13G-1 with the resist film as a mask for patterning as shown in FIG. 19E.

Figure 19F:
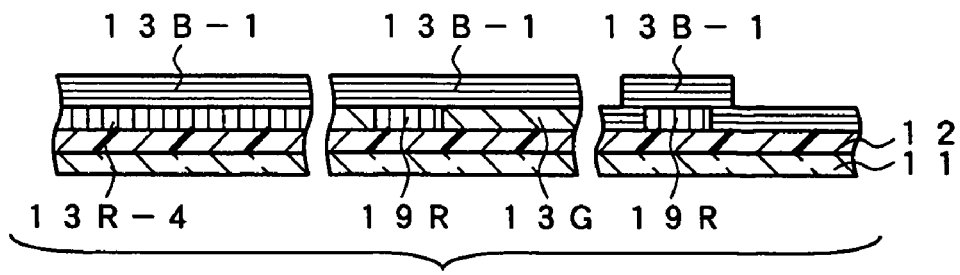

A blue resin layer 13B-1 is formed on the entire surface as shown in FIG. 19F, and resist films (not shown) is formed on areas corresponding to blue pixels on the resin layer 13B-1, with openings formed at areas aligned to the red color filters 19R on the blue pixels.

Figure 19G:
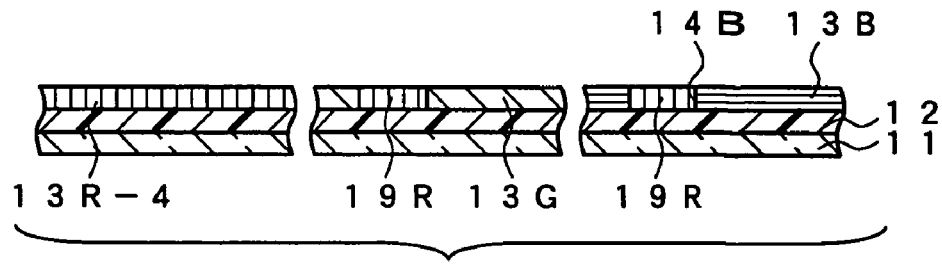

Then, the blue color filters 13B with the openings 14B are formed by etching the resin layer 13B-1 with the resist film as a mask for patterning as shown in FIG. 19G.

Figure 19H:
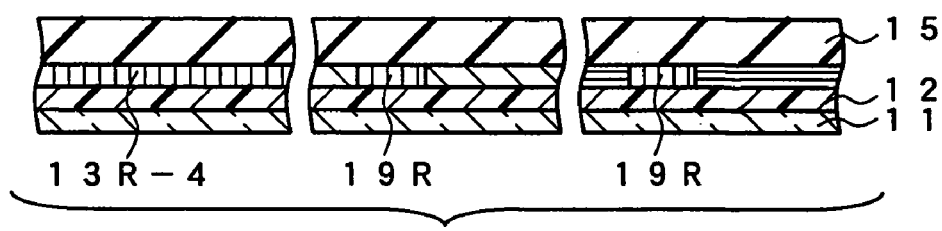
Figure 19I:
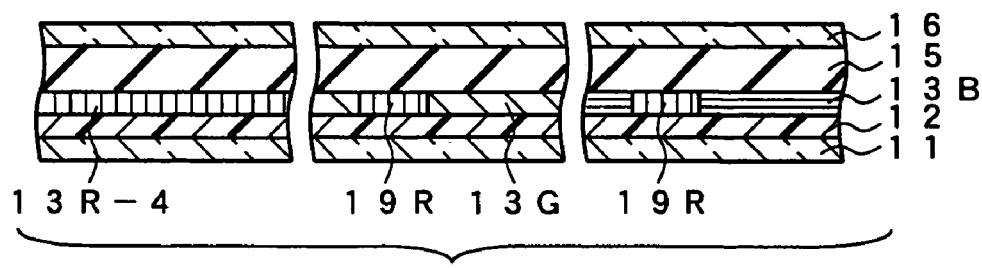

The CF substrate 1 is completed by forming the flattening film 15 on the entire surface as shown in FIG. 19H. Then, the orientation film 16 is pattern-formed by offset printing on the flattening film 15 as shown in FIG. 19I. The conductive layer (not shown) is formed on a rear side of the second transparent substrate 11 before forming the black matrix 12. For manufacturing the active matrix type liquid crystal display, for example, the CF substrate 1 manufactured in the process described above, and the TFT substrate 2 are adhered together at a predetermined distance with a spacer or the like between them, and the liquid crystal is infused into the space. Then, an infusing hole for infusing the liquid crystal is sealed, and the polarization plates (not shown) are adhered to the CF substrate 1 and the TFT substrate 2.

With this manufacturing method, it is only required to change the pattern of resist film, it is possible to use an apparatus used for manufacturing conventional liquid crystal displays, and an increase of number of processes is avoided as the first embodiment.

Figure 20:
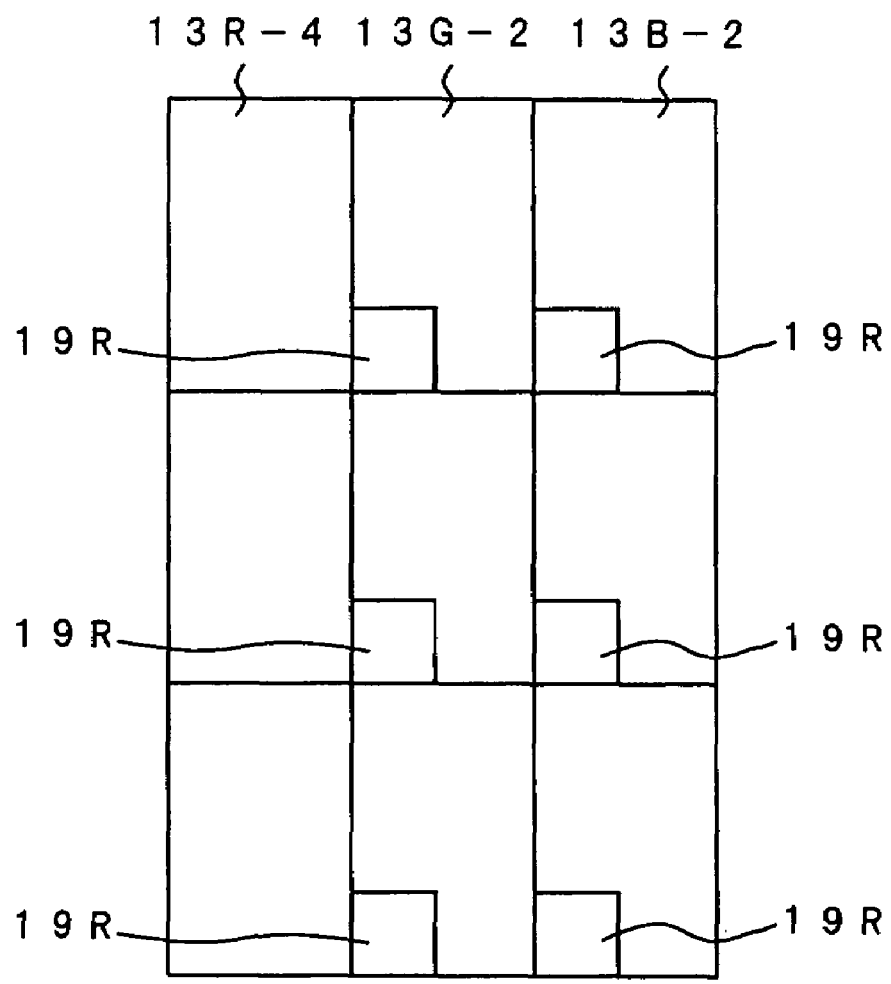
FIG. 20 is a schematic showing a pattern of color filters provided on the CF substrate for an active matrix type liquid crystal display according to a fifth embodiment of the present invention.

The following section describes a fifth embodiment of the present invention. The fifth embodiment is an embodiment in which the fourth embodiment is applied to the second embodiment. FIG. 20 is a schematic showing a pattern of color filters provided on the CF substrate for an active matrix type liquid crystal display according to the fifth embodiment of the present invention. Constituting elements of the fifth embodiment shown in FIG. 20 equivalent to those in the second embodiment shown in FIG. 14 and in the fourth embodiment shown in FIG. 16 have the same numerals, and are not provided with detailed descriptions.

Color filters 13R-4 is provided as red color filters, color filters 13G-2 and 13B-2 with a cut formed at a corner are provided as green and blue color filters respectively, and red color filters 19R are provided to align with the cutout corners in the fifth embodiment.

Since the degree of change in quality of the amorphous silicon layer 25 is almost uniform in all the pixels as well in fifth embodiment constituted as described above, a generation of residual image, color unevenness, and flicker is restrained during an operation for a long period.

Figure 21:
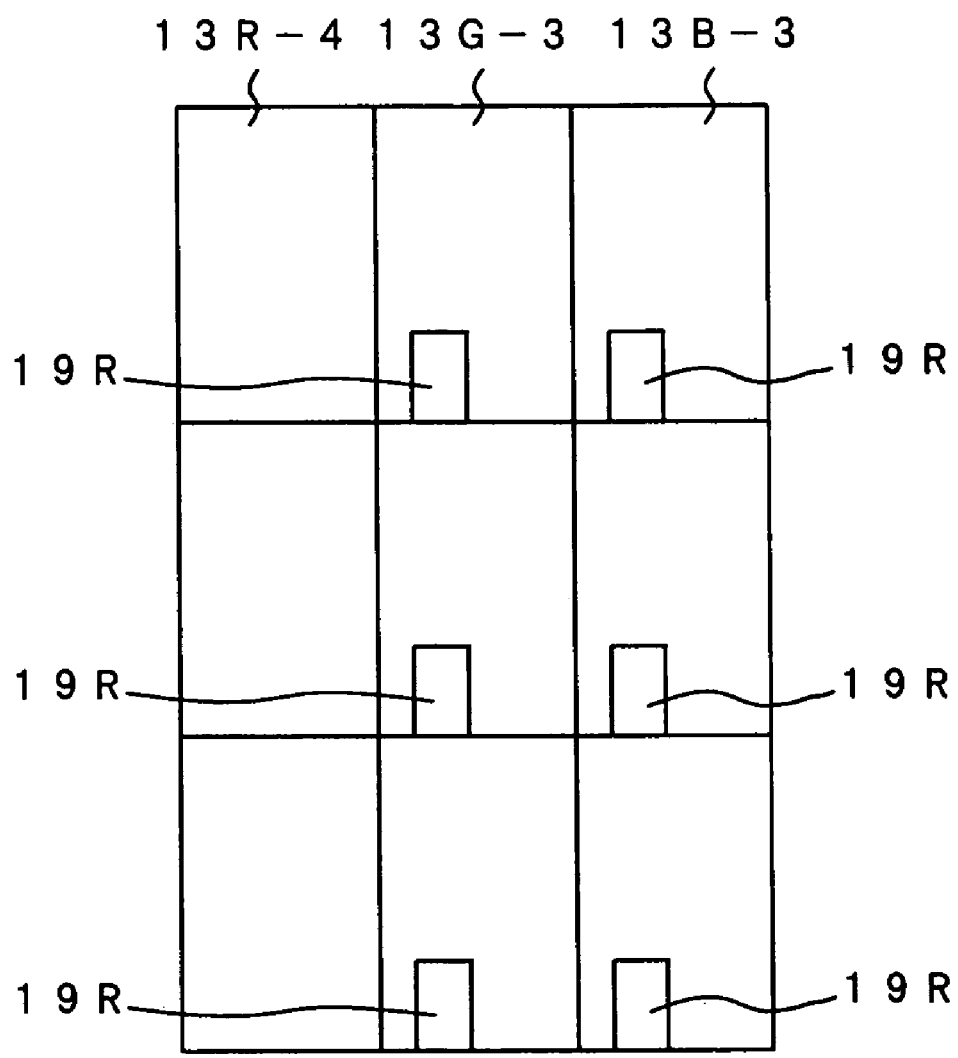
FIG. 21 is a schematic showing a pattern of color filters provided on a CF substrate for an active matrix type liquid crystal display according to a sixth embodiment of the present invention.

The following section describes a sixth embodiment of the present invention. The sixth embodiment is an embodiment in which the fourth embodiment is applied to the third embodiment. FIG. 21 is a schematic showing a pattern of color filters provided on the CF substrate for an active matrix type liquid crystal display according to the sixth embodiment of the present invention. Constituting elements of the sixth embodiment shown in FIG. 21 equivalent to those in the third embodiment shown in FIG. 15 and in the fourth embodiment shown in FIG. 16 have the same numerals, and are not provided with detailed descriptions.

Color filters 13R-4 is provided as red color filters, color filters 13G-3 and 13B-3 with a cut formed at a lower edge are provided as green and blue color filters respectively, and red color filters 19R are provided to align with the cutouts in the sixth embodiment.

Since the degree of change in quality of the amorphous silicon layer 25 is almost uniform in all the pixels as well in the sixth embodiment constituted as described above, a generation of residual image, color unevenness, and flicker is restrained during an operation for a long period.

Figure 22:
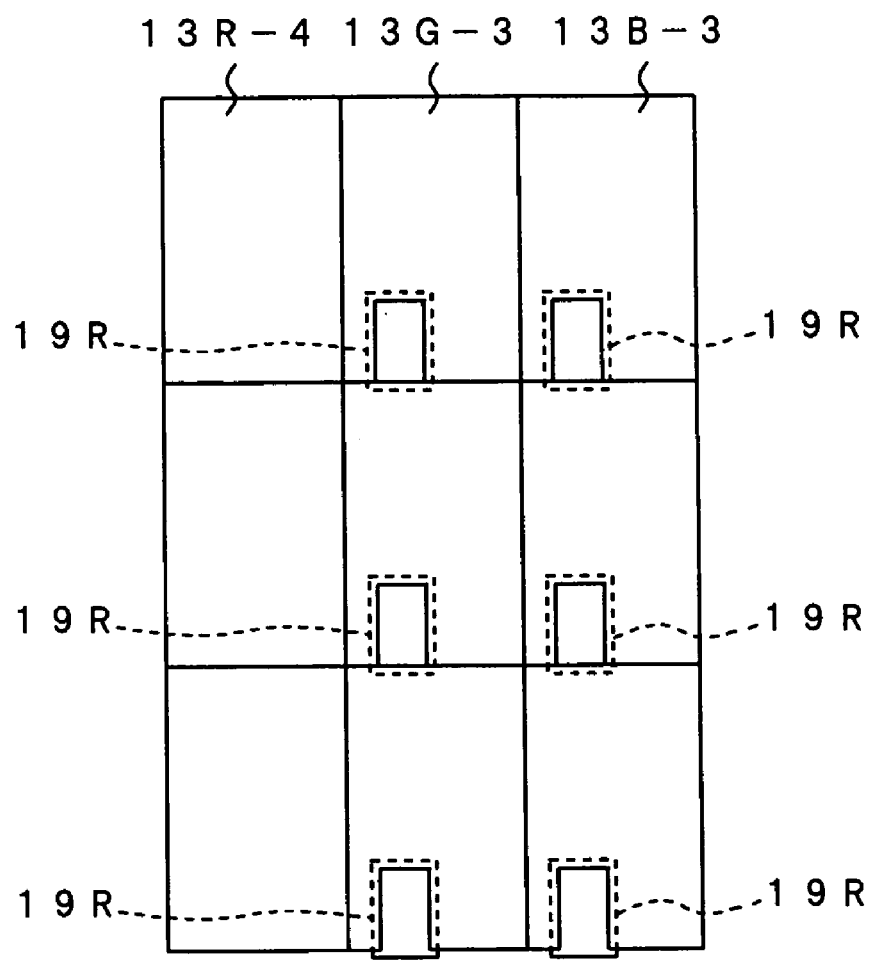
FIG. 22 is a schematic showing a pattern of color filters provided on a CF substrate for an active matrix type liquid crystal display according to a seventh embodiment of the present invention.

The following section describes a seventh embodiment of the present invention. FIG. 22 is a schematic showing a pattern of color filters provided on the CF substrate for an active matrix type liquid crystal display according to the seventh embodiment of the present invention. Constituting elements of the seventh embodiment shown in FIG. 22 equivalent to those in the sixth embodiment shown in FIG. 21 and in the fourth embodiment shown in FIG. 16 have the same numerals, and are not provided with detailed descriptions.

Though the red color filters 19R are provided to align with the cutouts formed respectively on the color filters 13G-3 and 13B-3 in the sixth embodiment, the red color filters 19R are provided in such a manner that they extend from the cutouts on the four edges on a lower layer under the color filters 13G-3 and 13B-3 in the seventh embodiment. The width of overlaid areas of red color filter 19R and the color filters 13G-3 and 13B-3 is about 1 μm, for example.

Since the degree of change in quality of the amorphous silicon layer 25 is almost uniform in all the pixels as well in the seventh embodiment constituted as described above, a generation of residual image, color unevenness, and flicker is restrained during an operation for a long period.

Figure 23:
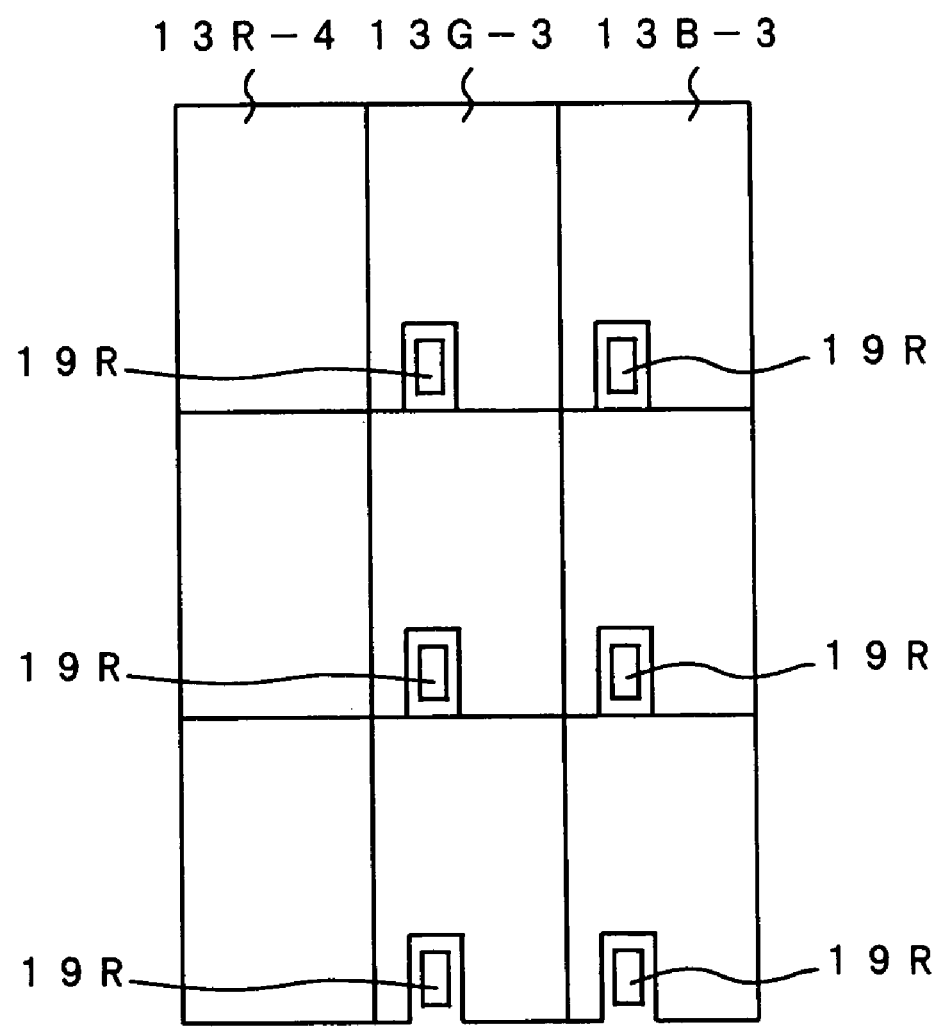
FIG. 23 is a schematic showing a pattern of color filters provided on a CF substrate for an active matrix type liquid crystal display according to an eighth embodiment of the present invention.

The following section describes an eighth embodiment of the present invention. FIG. 23 is a schematic showing a pattern of color filters provided on a CF substrate for an active matrix type liquid crystal display according to the eighth embodiment of the present invention. Constituting elements of the eighth embodiment shown in FIG. 23 equivalent to those in the sixth embodiment shown in FIG. 21 and in the fourth embodiment shown in FIG. 16 have the same numerals, and are not provided with detailed descriptions.

The red color filters 19R are provided in such a manner that they are formed smaller than the cutouts on the lower layer under the color filters 13G-3 and 13B-3, and gaps exist between the red color filters 19R and the color filters 13G-3 and 13B-3 in the present embodiment. The width of gaps of red color filter 19R and the color filters 13G-3 and 13B-3 is about 1 μm, for example.

Since the degree of change in quality of the amorphous silicon layer 25 is almost uniform in all the pixels as well in the eighth embodiment constituted as described above, a generation of residual image, color unevenness, and flicker is restrained during an operation for a long period.

Figure 24:
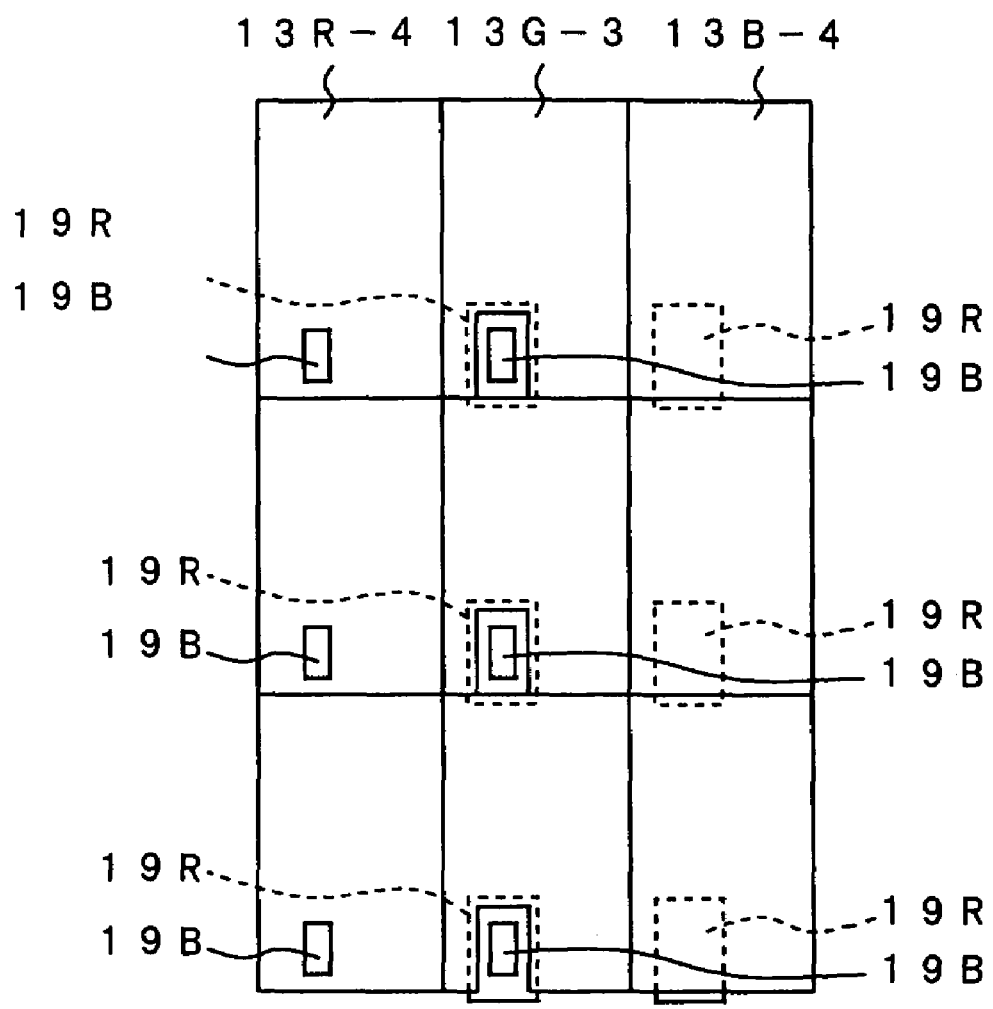
FIG. 24 is a schematic showing a pattern of color filters provided on a CF substrate for an active matrix type liquid crystal display according to a ninth embodiment of the present invention.

The following section describes a ninth embodiment of the present invention. FIG. 24 is a schematic showing a pattern of color filters provided on a CF substrate for an active matrix type liquid crystal display according to the ninth embodiment of the present invention. Constituting elements of the ninth embodiment shown in FIG. 24 equivalent to those in the seventh embodiment shown in FIG. 22 and in the fourth embodiment shown in FIG. 16 have the same numerals, and are not provided with detailed descriptions.

The color filters 13R-4 and color filters 13B-4 are provided as red and blue color filters, respectively, in the present embodiment. The color filters are rectangular without a cutout or the like, as the color filters 13R-4. The color filters 13G-3 with a cutout formed at the lower edge are provided as green color filters. The red color filters 19R are provided in such a manner that they extend from the cutouts on the four edges on the lower layer under the green color filters 13G-3 as in the seventh embodiment. Though cutouts are not formed on the blue color filters 13R-4, the red color filters 19R are provided on the lower layer under it as in the seventh embodiment. Blue color filters 19B smaller than the cutout are formed on the red color filters 19R in the cutouts of the green color filters 13G-3. The blue color filters 19B are formed on the red color filters 13R-4 at the same position as in the green color filters 13G.

There are the blue color filters and the red color filters on the lower layer under the orientation film 16 and the flattening film 15 opposing to the TFT's 35 in any pixels in the ninth embodiment constituted as described above. The intensity of light which is reflected on the CF substrate, and comes into the amorphous silicon layer 25 is lower than that in the fourth embodiment described in FIG. 17 and FIG. 18, and is almost constant. Thus, the degree of change in quality of the amorphous silicon layer 25 is almost uniform in all the pixels, and a generation of residual image, color unevenness, and flicker is restrained during an operation for a long period.

Figure 25:
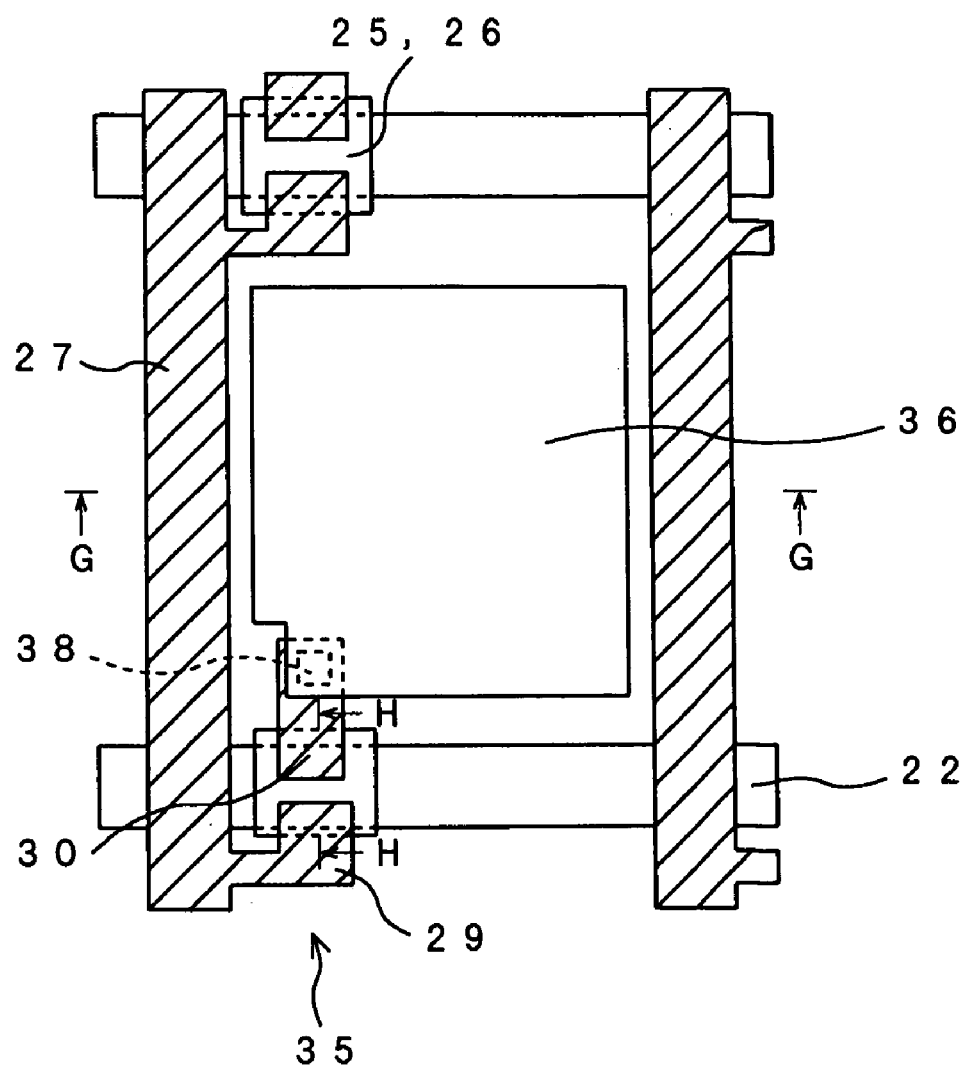
FIG. 25 is a schematic showing a TFT substrate for an active matrix type liquid crystal display according to a tenth embodiment.
Figure 26A:
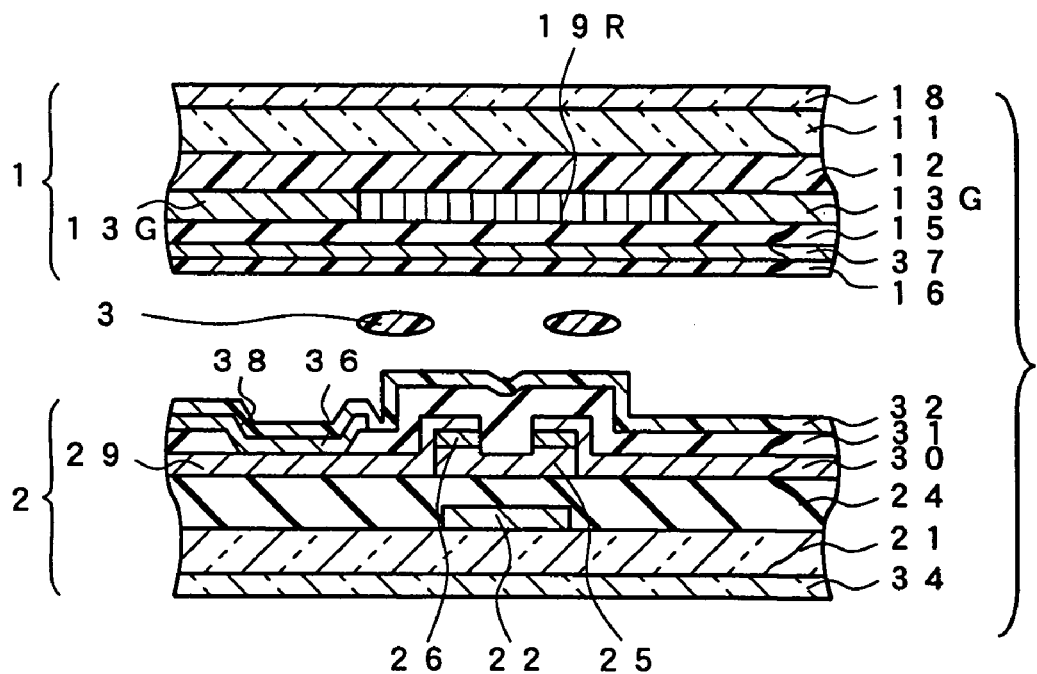
FIG. 26A is a section view along a G-G line in FIG. 25.
Figure 26B:
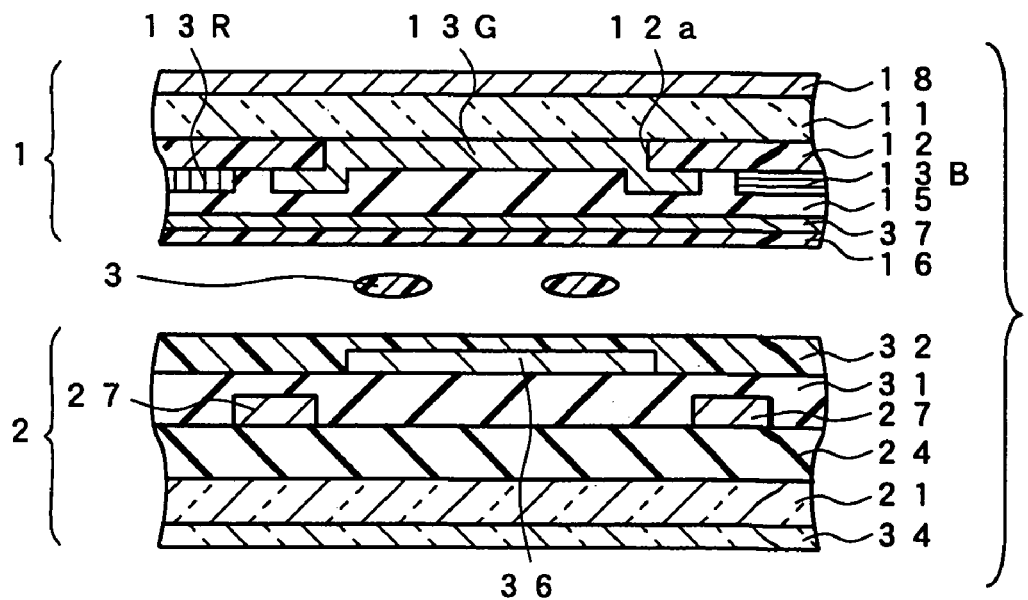
FIG. 26B is a section view along an H-H line in FIG. 25.

The following section describes a tenth embodiment of the present invention. The tenth embodiment is an active matrix type liquid crystal display with twisted nematic (TN) type used in a vertical electric field mode. FIG. 25 is a schematic showing a TFT substrate for an active matrix type liquid crystal display according to the tenth embodiment. FIG. 26A is a section view along a G-G line in FIG. 25, and FIG. 26B is a section view along an H-H line in FIG. 25. Constituting elements of the tenth embodiment shown in FIG. 25 and FIG.

26 equivalent to those in the fourth embodiment shown in FIG. 17 and FIG. 18 have the same numerals, and are not provided with detailed descriptions.

A common electrode 37 is formed between the flattening film 15 and the orientation film 16 in CF substrate 1 in the tenth embodiment. The conductive film 17 is not formed on the rear side of the second transparent substrate 11, and the polarization plate 18 is directly adhered. The common electrode 23 is not formed on the first transparent substrate 21, and rectangular plate-like pixel electrodes 36 are formed on the passivation film 31 in TFT substrate 2. The pixel electrode 36 is connected to the source electrode 30 through a contact hole 38 formed on the passivation film 31.

Light which is reflected on the CF substrate and comes into the amorphous silicon layer 25 is almost constant in the liquid crystal display of TN mode constituted as described above. Thus, the degree of change in quality of the amorphous silicon layer 25 is almost uniform in all the pixels, and a generation of residual image, color unevenness, and flicker is restrained during an operation for a long period.

Figure 27:
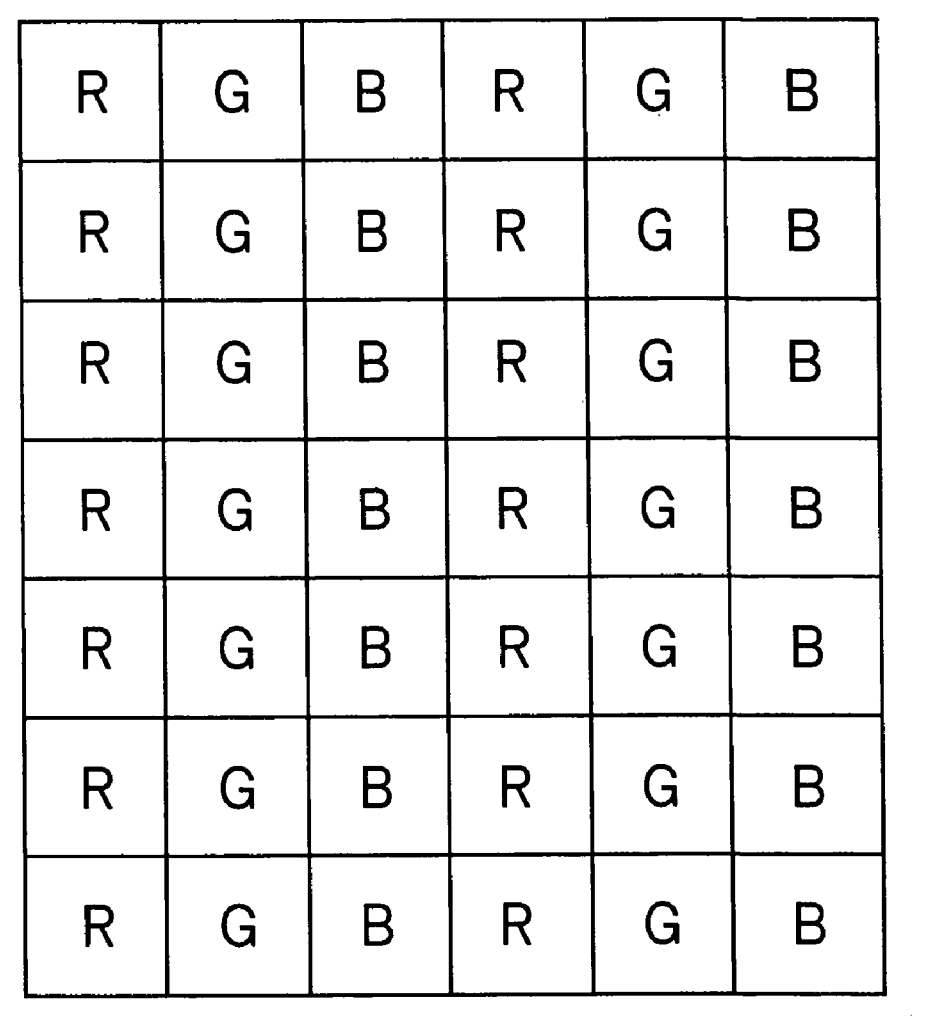
Figure 29:
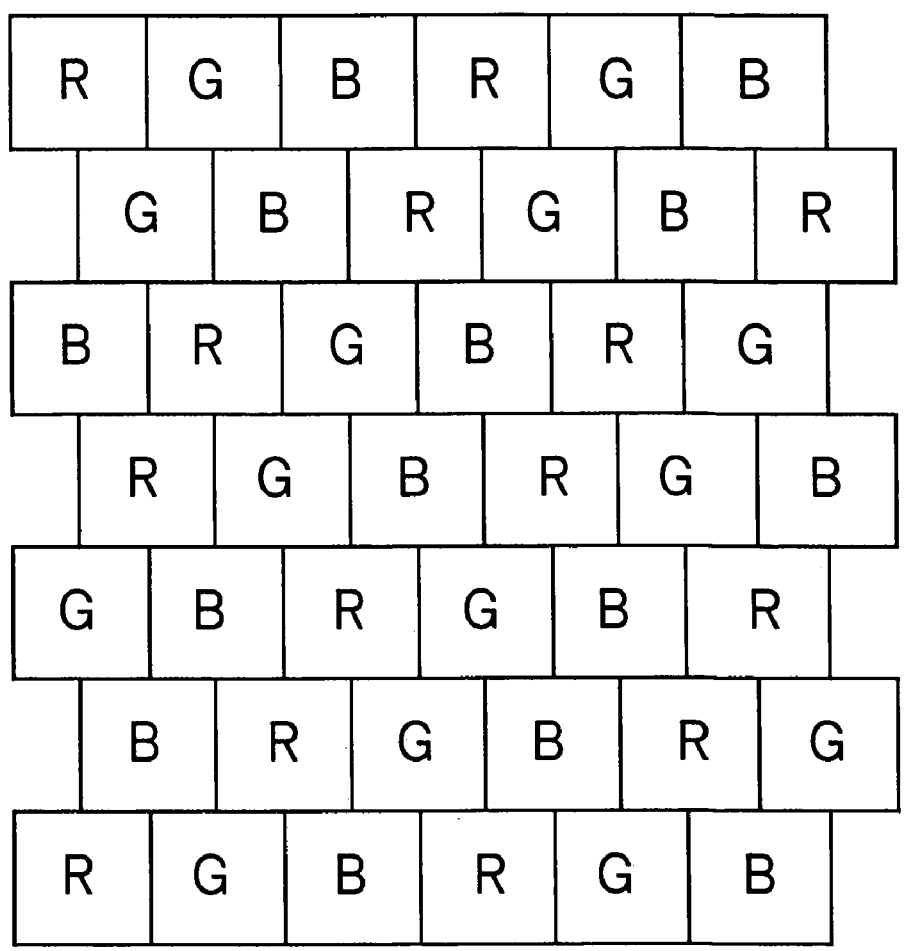
FIG. 29 is a schematic showing a delta-like pattern of pixels.

The placement pattern of pixels is not limited to the stripe pattern as in the embodiments described above. FIG. 27 is a schematic showing a stripe-like pattern of pixels, FIG. 28 is a schematic showing a mosaic-like pattern of pixels, and FIG. 29 is a schematic showing a delta-like pattern of pixels.

The embodiments described above adopt a stripe-like pattern as shown in FIG. 27. It is possible to adopt the mosaic-like pattern, where the red pixels (R), the green pixels (G), and the blue pixels (B) are arranged sequentially in the vertical and horizontal directions as shown in FIG. 28. It is also possible to adopt the delta-like pattern, where pixels are shifted by ½ pixel in the horizontal direction line by line, and RGB is composed of two pixels neighboring in the horizontal direction and one pixel placed above or below these pixels as shown in FIG. 29. It is necessary that the color filters neighboring in the vertical direction are in contact with each other in either of these patterns.

The method for driving the active matrix type liquid crystal display relating the present invention is not limited to a dot inversion driving for inverting the polarities of impressed voltage between neighboring pixels. FIG. 30 is a schematic showing another driving method.

For example, the green pixels (G) are placed in every another column, and columns with the red pixels (R) and the blue pixels (B) placed alternately are placed between the columns of green pixels (G). The color filters of pixels neighboring in the vertical direction are in contact with each other. It is possible to drive in such a manner that the red pixel (R) and the green pixel (G) placed on its left side are arranges as one unit, the blue pixel (B) and the green pixel (G) placed on its left side are arranged as one unit, and the polarities of voltage applied to the units neighboring each other are inverted.

It is possible to provide a light-shielding film made of a material not same as that for the color filter but same as that for the black matrix on the openings, the cutouts and the like.

What is claimed is:

1. A color filter substrate of a liquid crystal display panel constituted by said color filter substrate and a TFT substrate and a liquid crystal provided between them, comprising:
    a transparent substrate;
    color filters of three colors, at least two of which have an opening provided at every pixel on said transparent substrate, said openings being opposed to and vertically aligned with a thin film transistor formed on said TFT substrate, said color filters of three colors neighboring each other in one direction being connected to and aligned with each other in a plane of the color filter substrate, and data lines being aligned along said one direction; and
    color filters located in said openings with a material identical to any one of said color filters of three colors and different from the color of the color filter in which the opening is provided.

2. An active matrix type liquid crystal display comprising a color filter substrate according to claim 1.

3. A color filter substrate of a liquid crystal display panel constituted by said color filter substrate and a TFT substrate and a liquid crystal provided between them, comprising:
    a transparent substrate;
    color filters of three colors, at least two which having a cutout provided at every pixel on said transparent substrate, said cutouts being opposed to and vertically aligned with a thin film transistor formed on said TFT substrate, said color filters of three colors neighboring each other in one direction being connected to and aligned with each other in a plane of the color filter substrate, and data lines being aligned along said one direction; and
    color filters located in said cutouts with a material identical to any one of said color filters of three colors and different from the color of the color filter in which the cutout is provided.

* * * * *